United States Patent [19]
Gray et al.

[11] Patent Number: 5,754,377
[45] Date of Patent: May 19, 1998

[54] THIN FILM MAGNETIC HEAD INCLUDING AN ELEVATED GAP STRUCTURE

[75] Inventors: G. Robert Gray, Fremont; Arun Malhotra, San Jose, both of Calif.

[73] Assignee: AIWA Research and Development, Inc., Fremont, Calif.

[21] Appl. No.: 296,388

[22] Filed: Aug. 26, 1994

[51] Int. Cl.$^6$ ............................................. G11B 5/147
[52] U.S. Cl. ........................................................ 360/126
[58] Field of Search ................................. 360/119, 122, 360/125, 126

[56] References Cited

U.S. PATENT DOCUMENTS

| | | | |
|---|---|---|---|
| 3,723,665 | 3/1973 | Lazzari et al. | 360/123 |
| 4,414,554 | 11/1983 | Springer | 360/126 |
| 4,470,051 | 9/1984 | Springer | 360/110 |
| 4,494,125 | 1/1985 | Springer | 346/74.5 |
| 4,503,439 | 3/1985 | Springer | 360/110 |
| 4,503,440 | 3/1985 | Springer | 360/110 |
| 4,517,616 | 5/1985 | Bischoff | 360/126 |
| 4,539,280 | 9/1985 | Springer | 430/39 |
| 4,544,421 | 10/1985 | Springer | 148/103 |
| 4,639,289 | 1/1987 | Lazzari | 360/123 |
| 4,809,103 | 2/1989 | Lazzari | 360/126 |
| 4,837,924 | 6/1989 | Lazzari | 360/125 |
| 4,901,177 | 2/1990 | Lazzari | 360/113 |
| 4,912,584 | 3/1990 | Mallary et al. | 360/126 |

(List continued on next page.)

FOREIGN PATENT DOCUMENTS 4-182911   6/1992   Japan .

OTHER PUBLICATIONS

IEEE Trans. on Magnetics, "Thin Film Magnetic Film Head Composed of Inorganic Materials", Yoshimizu et al, vol. 28, No. 5, pp. 2112–2114, Sep. 1992.

IBM Tech. Disclosure Bulletin, "High–Density Head", Kehr et al, vol. 18, No. 1, pp. 27–28, Jun. 1975.

IEEE Trans. on Magnetics, "A New Thin Film Head Generation IC Head", Lazzari et al, vol. 25, No. 5, pp. 3173–3186, 3190–3193, Sep. 1989.

A. Sano, M. Egawa, M. Nitta, K. Takayanagi, T. Matsushita, and T. Fujita, A Low Inductance Metal–in–Gap Head Using a Side–Core Concept. IEEE Transactions on Magnetics, vol. 29, No. 6, pp. 3888–3890, Nov. 1993.

K.L. Mittal, Factors Affecting Adhesion of Lithographic Materials, Solid State Technology, May 1979, pp. 89–95 and 100.

*Primary Examiner*—Stuart S. Levy
*Assistant Examiner*—David L. Ometz
*Attorney, Agent, or Firm*—Skjerven, Morrill, MacPherson, Franklin & Friel LLP; Ken J. Koestner

[57] ABSTRACT

A thin film magnetic head is provided in which a magnetic yoke assembly is built up, layer by layer, atop a substrate using semiconductor thin film techniques. A lower yoke assembly is first fabricated including a lower magnetic layer situated on the substrate and first and second side poles built up vertically from the ends of the lower magnetic layer. An insulative pedestal surrounded by a frame is formed at the top of the lower yoke assembly and extends above the uppermost lateral plane of the yoke assembly. A diamond-like carbon (DLC) wear layer is deposited atop the pedestal. First and second pole support wells are excavated in the DLC layer so as to expose the first and second side poles therebelow, and further to receive first and second pole supports, respectively, therein. First and second pole extension members are situated on the first and second pole support members, respectively, with a non-magnetic gap region being situated between the first and second pole extension members. A second DLC layer is situated in the same plane as the non-magnetic gap region and the first and second pole extension members. The second DLC layer substantially surrounds the first and second side pole extensions and the gap region. In this manner, the gap region is elevated above the plane of the first and second pole support members and is protected from undesired head wear.

6 Claims, 18 Drawing Sheets

U.S. PATENT DOCUMENTS

| | | | |
|---|---|---|---|
| 4,942,490 | 7/1990 | Lehureau | 360/126 |
| 4,949,207 | 8/1990 | Lazzari | 360/126 |
| 4,970,615 | 11/1990 | Gau | 360/126 |
| 4,984,118 | 1/1991 | Springer | 360/125 |
| 4,992,897 | 2/1991 | Deroux-Dauphin | 360/126 |
| 5,020,212 | 6/1991 | Michijima et al. | 360/127 |
| 5,041,932 | 8/1991 | Hamilton | 360/126 |
| 5,065,271 | 11/1991 | Matsuura et al. | 360/126 |
| 5,073,242 | 12/1991 | Hamilton | 204/192.22 |
| 5,090,111 | 2/1992 | Lazzari | 360/119 |
| 5,111,351 | 5/1992 | Hamilton | 360/126 |
| 5,122,917 | 6/1992 | Springer | 360/126 |
| 5,159,508 | 10/1992 | Grill et al. | 360/103 |
| 5,163,218 | 11/1992 | Hamilton | 360/122 |
| 5,166,845 | 11/1992 | Thompson et al. | 360/103 |
| 5,168,408 | 12/1992 | Lazzari | 360/113 |
| 5,189,580 | 2/1993 | Pisharody et al. | 360/126 |
| 5,195,006 | 3/1993 | Morikawa | 360/126 |
| 5,196,976 | 3/1993 | Lazzari | 360/126 |
| 5,198,948 | 3/1993 | Stover et al. | 360/126 |
| 5,202,863 | 4/1993 | Miyatake et al. | 360/103 |
| 5,208,716 | 5/1993 | Lazzari | 360/126 |
| 5,216,559 | 6/1993 | Springer | 360/106 |
| 5,224,260 | 7/1993 | Fedeli et al. | 360/127 |
| 5,260,845 | 11/1993 | Takayama et al. | 360/126 |
| 5,266,409 | 11/1993 | Schmidt et al. | 360/112 |
| 5,274,521 | 12/1993 | Miyauchi et al. | 360/126 |
| 5,384,195 | 1/1995 | Bachmann et al. | 360/122 |
| 5,396,389 | 3/1995 | Terada et al. | 360/126 |
| 5,408,373 | 4/1995 | Bajorek et al. | 360/126 |
| 5,454,158 | 10/1995 | Fontana, Jr. et al. | 360/122 |
| 5,490,028 | 2/1996 | Aug et al. | 360/126 |
| 5,563,754 | 10/1996 | Gray et al. | 360/126 |
| 5,621,594 | 4/1997 | Gray et al. | 360/126 |

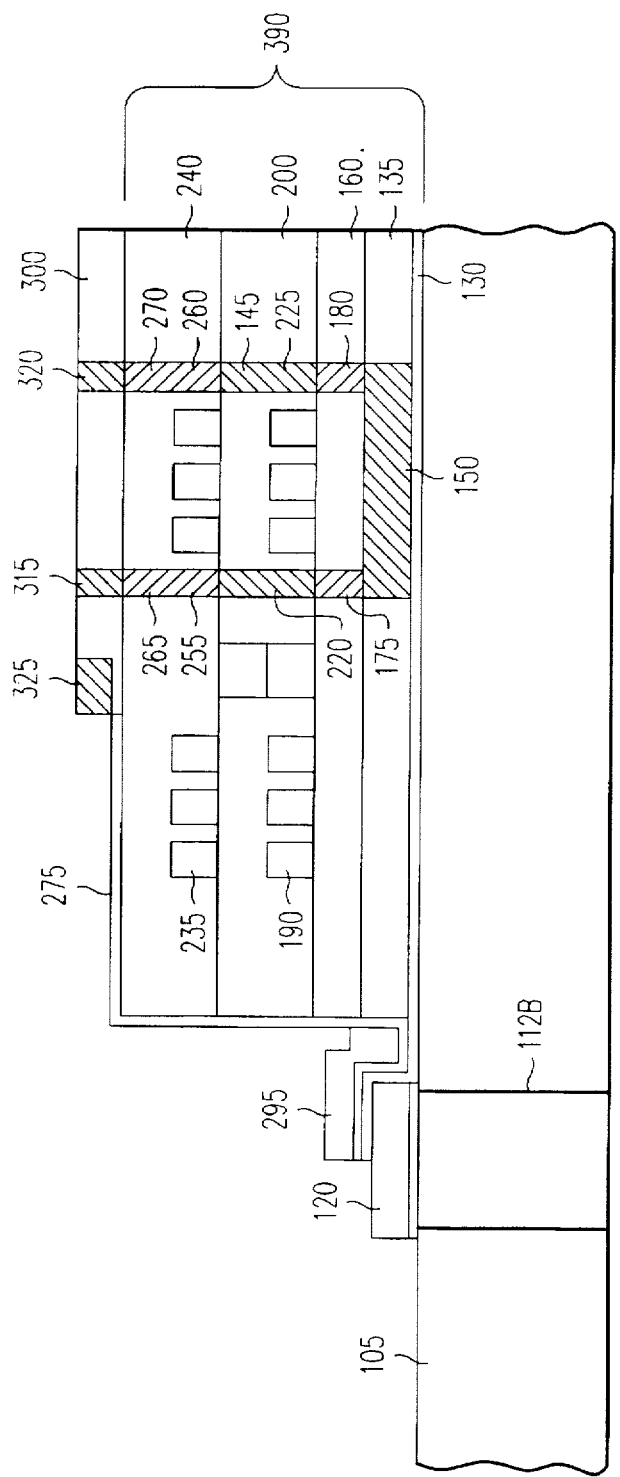
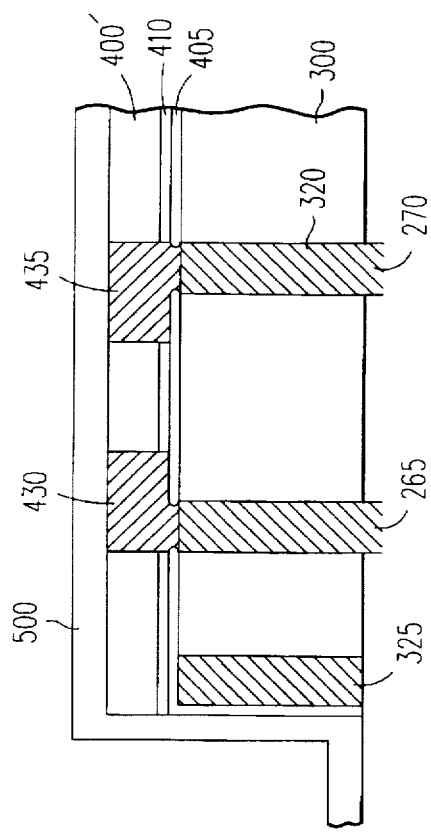
FIG. 2B
FIG. 11

THIN FILM MAGNETIC HEAD INCLUDING AN ELEVATED GAP STRUCTURE

CROSS REFERENCE TO RELATED PATENT APPLICATIONS

This patent application is related to the patent application entitled "METHOD OF FABRICATING A THIN FILM MAGNETIC HEAD INCLUDING LAYERED MAGNETIC SIDE POLES", U.S. patent application Ser. No. 08/297,186, abandoned and continued as U.S. patent application Ser. No. 08/641,345 by Malhotra et al., filed concurrently herewith and assigned to the same assignee, the disclosure of which is incorporated herein by reference.

This patent application is also related to the patent application entitled "THIN FILM MAGNETIC HEAD INCLUDING A SEPARATELY DEPOSITED DIAMOND-LIKE CARBON GAP STRUCTURE" U.S. patent application Ser. No. 08/297,185, abandoned and continued as U.S. patent application Ser. No. 08/795,268 by G. Robert Gray and Arun Malhotra, filed concurrently herewith and assigned to the same assignee, the disclosure of which is incorporated herein by reference.

BACKGROUND OF THE INVENTION

1. Field of the Invention

This invention relates in general to magnetic recording and playback heads and, more particularly, to thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

Unfortunately, thin film magnetic heads are subject to substantial wear when the head contacts magnetic recording media such as tape, for example. Over time, this wear can be very considerable and ultimately may be a cause for head failure if accumulated wear significantly damages the head.

SUMMARY OF THE INVENTION

One advantage of the thin film head of the present invention is significantly reduced head wear.

Another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

Yet another advantage of the thin film head is improved coupling of the magnetic field in the gap region.

In accordance with one embodiment of the present invention, a thin film magnetic head is provided which includes a substrate and a lower pole member of magnetic material situated on the substrate. The lower pole member includes first and second ends. The thin film head includes first and second side pole members of magnetic material situated at the first and second ends, respectively, of the lower pole member. The first and second side pole members are built up from a plurality of layers of magnetic material deposited layer upon layer, the first and second side pole members including tops and bottoms. The head also includes an insulative body situated about the first and second side poles and built up from a plurality of layers of electrically insulative material. The head further includes a conductor coil situated within the insulative body and around one of the first and second side pole members. The thin film head still further includes an insulative pedestal situated at the tops of the first and second side pole members, the insulative pedestal extending above the plane of the insulative body below and surrounding the tops of the first and second side pole members. The head includes a first diamond-like carbon (DLC) layer situated on the insulative pedestal and has first and second pole support wells which are open to the tops of the first and second side pole members below, the first and second pole support wells being laterally spaced apart to form a DLC gap section therebetween. The thin film head further includes first and second pole piece support members of magnetic material situated in the first and second pole support wells. The head also includes first and second pole piece extension members of magnetic material situated atop the first and second pole piece support members. Still further, the thin film head includes a gap region of nonmagnetic material situated between the first and second pole piece extension members.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2B is a cross-sectional view of the thin film head of FIG. 2A taking along section line 2B—2B.

FIG. 11 is a top plan view of a partially complete thin film head which is an alternative embodiment of the invention.

DETAILED DESCRIPTION OF THE INVENTION

Figure 1:
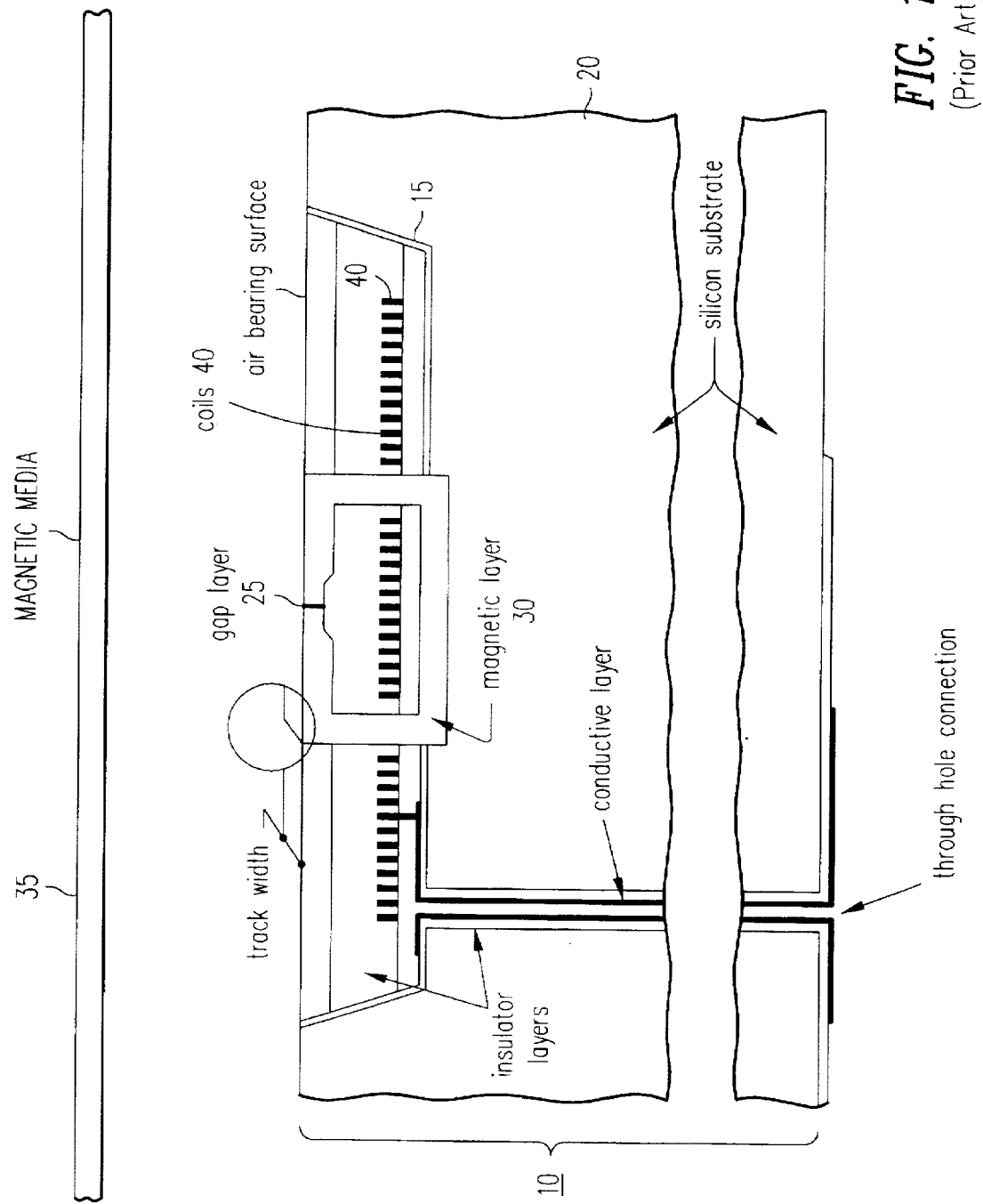
FIG. 1 is a cross section of a conventional thin film magnetic head.
Figure 2A:
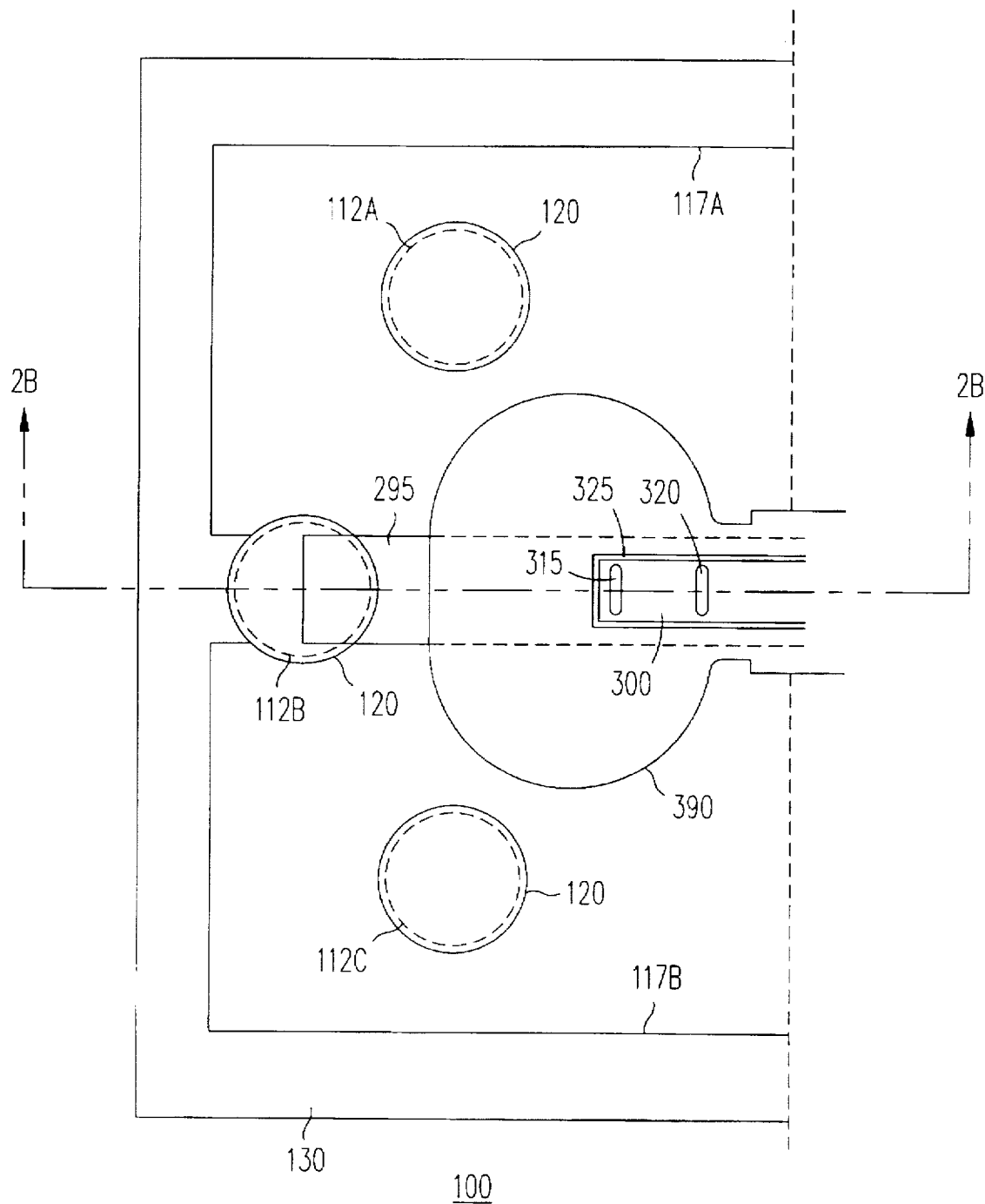
FIG. 2A is a top plan view of one embodiment of the thin film magnetic head of the present invention prior to completion of the pole structure.

FIG. 2A illustrates a top plan view of a partially complete thin film head 100 which is fabricated as described in detail in the patent application entitled "THIN FILM MAGNETIC HEAD INCLUDING LAYERED MAGNETIC SIDE POLES" by Arun Malhotra, G. Robert Gray, James Watterston and Jane Ang, U.S. patent application Ser. No. 08/297,186, abandoned and continued as U.S. patent application Ser. No. 08/641,345, which is incorporated herein by reference, and which is filed concurrently with this document and assigned to the same assignee. FIG. 2B is a cross-sectional view of head 100 taken along a section line 2B—2B.

As used in this document, the term "patterning" will mean the formation of a particular layer such that the layer exhibits a specified pattern. Conventional photolithographic techniques are available for such patterning of layers.

Thin film head 100 includes an alumina substrate 105 in which via holes are formed for receiving via connective members 112A, 112B and 112C. Via connective members 112A, 112B and 112C are covered by via caps 120 which protect the via connective members from etchants used in subsequent etching steps. Via connective member 112B connects to the ground of head 100. Via connective members 112A and 112C connect to respective ends of lower coil layer 190 and upper coil layer 235.

A magnetic yoke 145 is built up, layer by layer, on a seed layer 130 of conductive material disposed on the upper surface of substrate 105. One magnetic material which may be used as material for magnetic yoke 145 is nickel-iron (NiFe). Bottom magnetic layer 150 is plated in an opening in an insulative layer 135 which is situated atop seed layer 130. First magnetic side pole 265 is built up, layer by layer, at one end of bottom magnetic layer 150 while second magnetic side pole 270 is built up, layer by layer, at the other end of bottom magnetic layer 150 as shown in FIG. 2B. More specifically, each of the magnetic layers 175, 220, 255 and 315 which together form first side pole 265 are built up in open regions in respective insulative layers 160, 200, 240 and 300. Likewise, each of the magnetic layers 180, 225, 260 and 320 which together form second pole 270 are built up in open regions in respective insulative layers 160, 200, 240 and 300. Thus, magnetic yoke 145 is formed by bottom magnetic layer 150, magnetic layers 175, 220, 255, 315 and magnetic layers 180, 225, 260 and 320, all of which are plated using common seed layer 130 as an electrode.

Magnetic yoke 145 together with insulative layers 135, 160, 200 and 240, form a main body 390 from which insulative layer 300 protrudes or extends. Insulative layer 300 thus forms a pedestal and is alternatively referred to as pedestal 300 or protrusion 300. A chrome-copper seed layer 275 is deposited on head 100 to enable the plating and formation of frame 325. Seed layer 275 is then patterned and etched away in the area where insulative pedestal 300 is located as seen in FIG. 2B. As seen in FIG. 2A, open regions 117A and 117B extend from seed layer 130 to main body 390. Seed layer material is absent in these open regions.

Seed layer 275 acts as a seed for the subsequent plating of magnetic frame 325. One embodiment of head 100 includes a grounding strip 295 which couples via connective member 112B to magnetic yoke 145 by the electrically conductive path through seed layer 130. Grounding strip 295 and connective member 112B are omitted if grounding of head 100 is not desired for a particular application.

A frame 325 of magnetic material, for example NiFe, is patterned and plated around insulative pedestal 300 at the same time that magnetic side pole portions 315 and 320 are plated. Magnetic side pole portions 315 and 320 are the uppermost portion of side poles 265 and 270, respectively. Frame 325 exhibits a substantially rectangular shape in this particular embodiment and surrounds insulative pedestal 300 which forms the inner boundary of frame 325 as seen in FIG. 2A. Frame 325 provides structural integrity to pedestal 300.

Figure 3A:
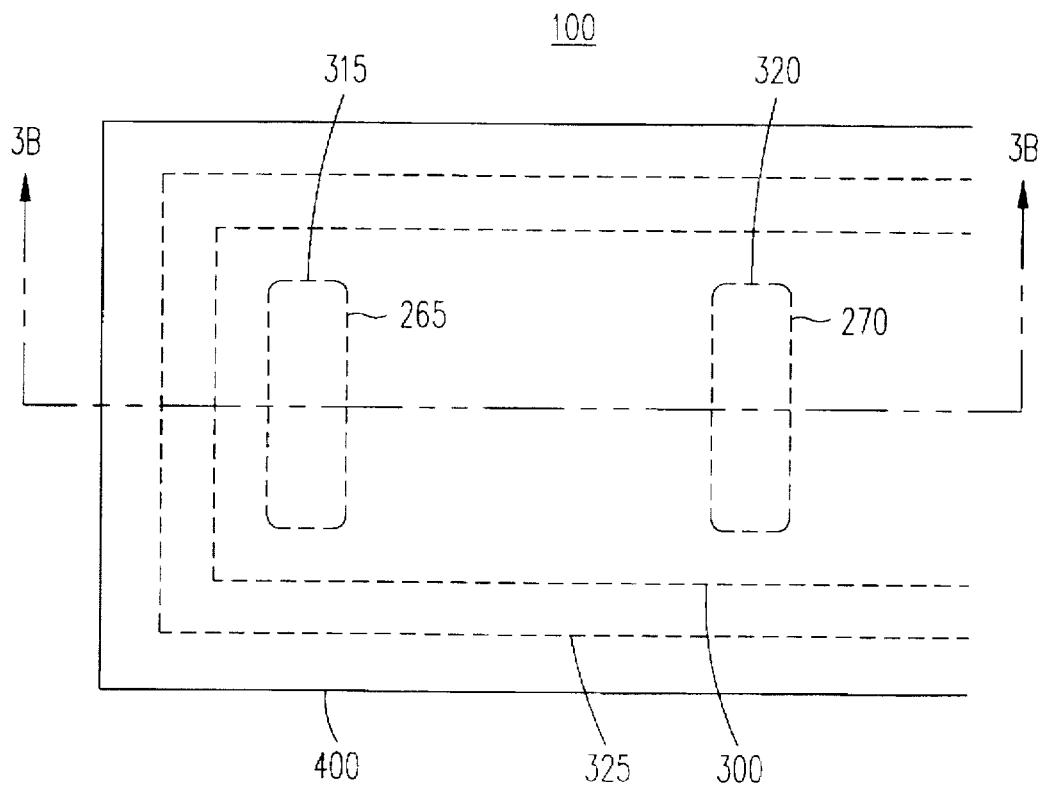
FIG. 3A is a close-up top plan view of the pole region of the thin film head of FIG. 2A after a lower diamond-like carbon (DLC) layer has been deposited on the head.

FIG. 3A is a top plan view of the side pole region of head 100 after a hard protective wear material layer 400, such as diamond-like carbon (DLC), and associated intermediate layers are formed on the upper surface of head 100 of FIG. of FIGS. 2A and 2B. Dashed lines are employed in FIG. 3A so that selected lower layers can be viewed. More particularly, magnetic side poles 265 and 270, insulative pedestal 300 and magnetic frame 325 are visible via dashed lines in FIG. 3A.

Figure 3B:
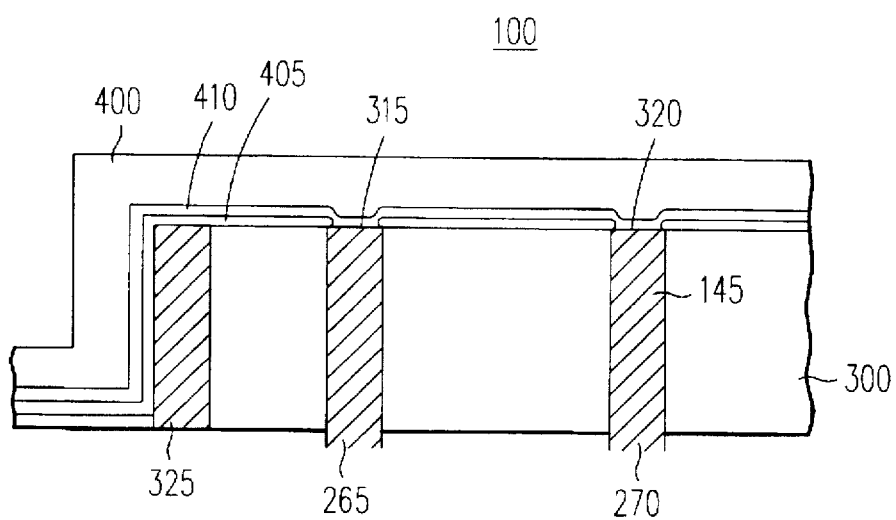
FIG. 3B is a cross-sectional view of the thin film head of FIG. 3A taking along section line 3B—3B.

Before DLC wear layer 400 is deposited on the side pole region of head 100, the upper surface of the side pole region is prepared by sputtering a Cr-NiV seed layer 405 thereon as seen in FIG. 3B. Seed layer 405 is patterned to expose side poles 265 and 270 of magnetic yoke 145 as indicated in the cross section of head 110 shown in FIG. 3B. In this instance, the patterning of seed layer 405 is done by a lift-off process. In this "lift-off" process, photoresist (not shown) is patterned to cover side poles 265 and 270. Seed layer 405 is then sputtered on the entire upper surface of the partially completed head 100. The photo-resist which covers side poles 265 and 270 is now "lifted-off" head 100. To accomplish this lift-off, the partially complete head 100 is placed in an ultrasonic bath including a photoresist solvent such as acetone, for example. The seed layer 405 is sufficiently thin such that it does not cover photoresist layer at side poles 265 and 270 very well. In this manner, there are sufficient avenues of attack by which the solvent can get through seed layer 405 at the edges of side poles 265 and 270 to dissolve the photoresist layer at side poles 265 and 270. When the photoresist layer at side poles 265 and 270 is thus dissolved, the portions of seed layer 405 immediately above side poles 265 and 270 lift-off and float away. The region of head 100 at side poles 265 and 270 is thus void of seed layer 405 as shown in FIG. 3B.

A silicon layer 410 is sputtered on seed layer 405 to act as an adhesion layer for the subsequent deposition of DLC layer 400. A hard protective wear material layer 400 such as diamond-like carbon (DLC) is deposited on silicon adhesion layer 410 as seen in FIGS. 3A and 3B. In one embodiment, DLC layer 400 is deposited on silicon adhesion layer 410 by chemical vapor deposition (CVD). Adhesion layer 410 enhances the adhesion of DLC layer 400 to the layers of head 100 below. This silicon adhesion layer typically exhibits a thickness within the range of approximately 400 Å to approximately 1000 Å. This silicon adhesion layer exhibits a nominal thickness of approximately 600 Å in a preferred embodiment.

Figure 4A:
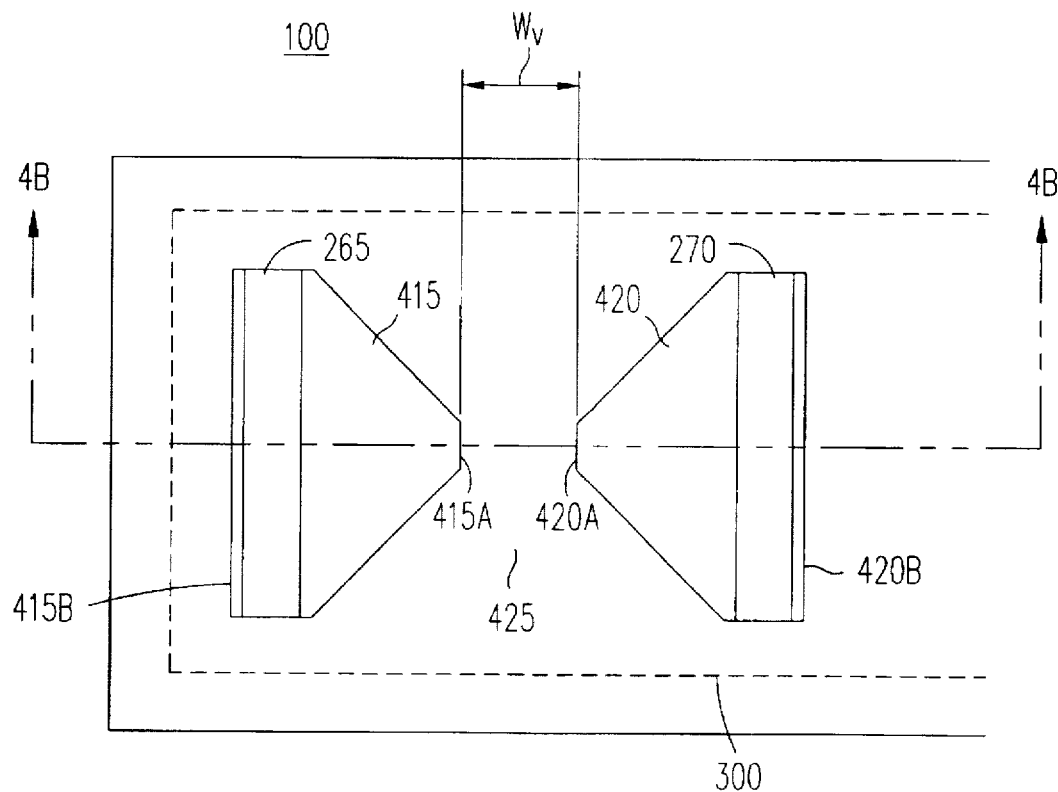
FIG. 4A is a top plan view of the thin film head after pole support wells are formed in the lower DLC layer.
Figure 4B:
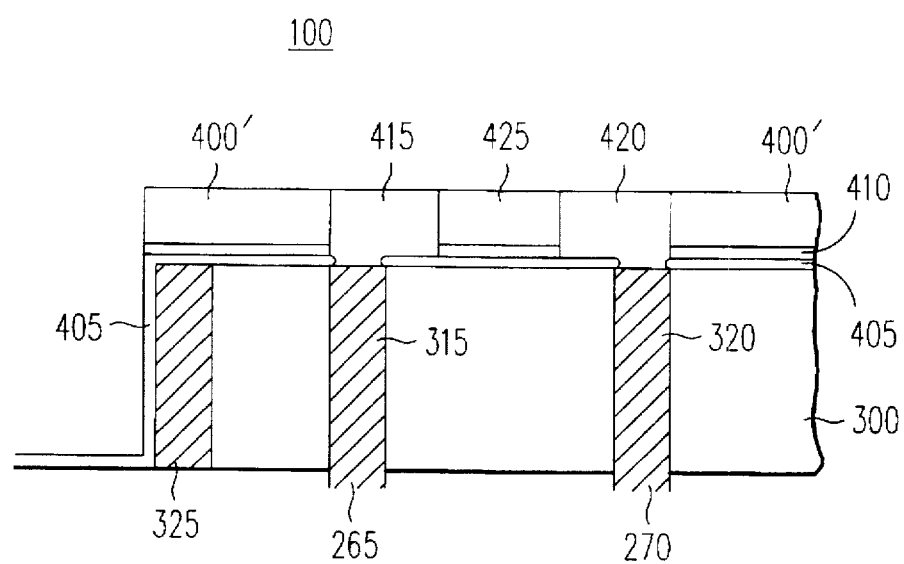
FIG. 4B is a cross-sectional view of the thin film head of FIG. 4A taken along section line 4B—4B.

DLC layer 400 is then patterned and reactive ion etched to form a DLC frame 400' which overlies magnetic frame 325 and the side pole region therein as shown in FIG. 4B. DLC frame 400' exhibits a substantially rectangular shape slightly larger than the substantially rectangular shape of magnetic frame 325 as seen in FIGS. 4A and 4B.

Protective layer 400 exhibits a Knoop hardness greater than 700 Knoop and preferably greater than 800 Knoop. The hardness of protective layer should be within the range of greater than approximately 700 Knoop to approximately 2000 Knoop. One material that is satisfactory for formation of protective wear layer 400 is diamond like carbon (DLC).

To form such a DLC frame 400', DLC layer 400 is chemically vapor deposited and patterned. More specifically, both DLC layer 400 and adhesion layer 410 are reactive ion etched to leave a DLC wear layer 400' over magnetic yoke 145 and insulative pedestal 300 as shown in FIG. 4B. Prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 400 external to frame 325 is etched away and the remaining portion of DLC layer 400 is protected and remains as DLC layer 400'.

An alternative to the above described photoresist masking approach to patterning DLC layer 400 into DLC layer 400' is to cover head 100 with a metal layer such as chromium. For example, a relatively thin photomask layer (not shown) of chromium is sputtered over the DLC layer. In this particular example, the photomask layer is approximately 500 Å thick. The metal photomask layer is photo-patterned and etched to expose DLC areas which are to be excavated by reactive ion etching. The DLC layer is then reactive ion etched to the desired DLC structure.

More detail is now provided with respect to the formation of DLC protective wear layer 400. Before DLC protective wear layer 400 is actually laid down on silicon adhesion layer 410, adhesion layer 410 is sputter cleaned. In the course of performing this sputter cleaning, approximately 200 Å of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie, the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20-approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5μ.

DLC fabricated in this manner results in a DLC layer 400 with a Knoop hardness of approximately 800. It is found that DLC layer Knoop hardnesses of greater than 700 up to approximately 2000 Knoop produce and acceptably hard wear layer 400 for wear protection purposes. DLC wear layer 400 is then reactive ion etched as described to form DLC wear layer 400'.

As part of these patterning and reactive ion etching steps which form DLC frame 400', DLC layer 400 is patterned and etched to form pole support wells 415 and 420 which together exhibit a bow-tie like shape. Pole wells 415 and 420 each exhibit a substantially triangular shape in which vertices 415A and 420A are truncated so as to be substantially parallel to each other and form a DLC gap region or section 425 therebetween. Alternatively, pole wells 415 and 420 can exhibit other geometries such as substantially rectangular, for example. In one embodiment of the invention, the spacing, $W_y$, between truncated vertices 415A and 420A is approximately 10–20 microns. Truncated vertices 415A and 420A form the narrow ends of pole wells 415 and 420 while the wide ends of the pole wells are designated as wide ends 415B and 420B as shown in FIG. 4A. As part of the same reactive ion etching step, the portion of silicon adhesion layer 410 between side poles 265 and 270 is ion etched away to expose seed layer 405 to permit subsequent pole plating thereon.

Figure 5A:
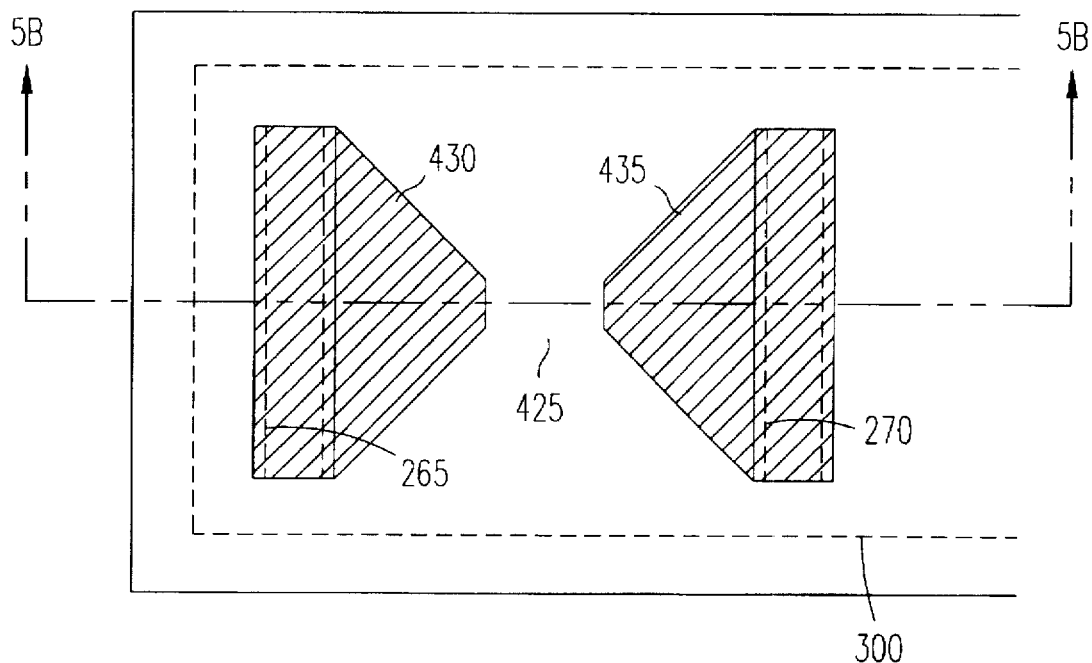
FIG. 5A is a top plan view of the thin film head after pole supports are formed in the pole support wells.
Figure 5B:
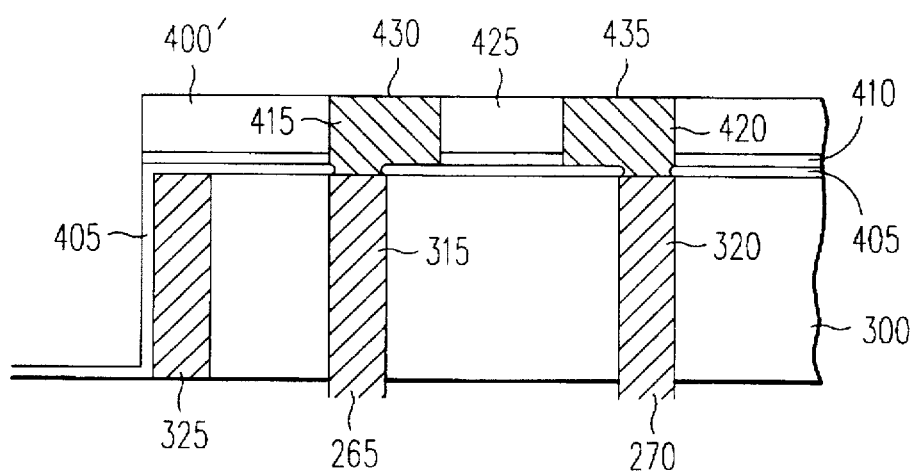
FIG. 5B is a cross-sectional view of the thin film head of FIG. 5A taken along section line 5B—5B.

Pole wells 415 and 420 are excavations in DLC wear layer 400' in which respective magnetic upper pole piece support members 430 and 435 (not shown in FIG. 4A, 4B) will be formed. More particularly, magnetic upper pole piece support members 430 and 435 are plated atop magnetic side poles 265, 270 and seed layer 410 to the top of pole wells 415 and 420 as shown in FIGS. 5A and 5B. Although support members 430 and 435 are situated atop magnetic side poles 265 and 270, side poles 265 and 270 are visible in FIG. 5A via dashed lines.

Figure 6A:
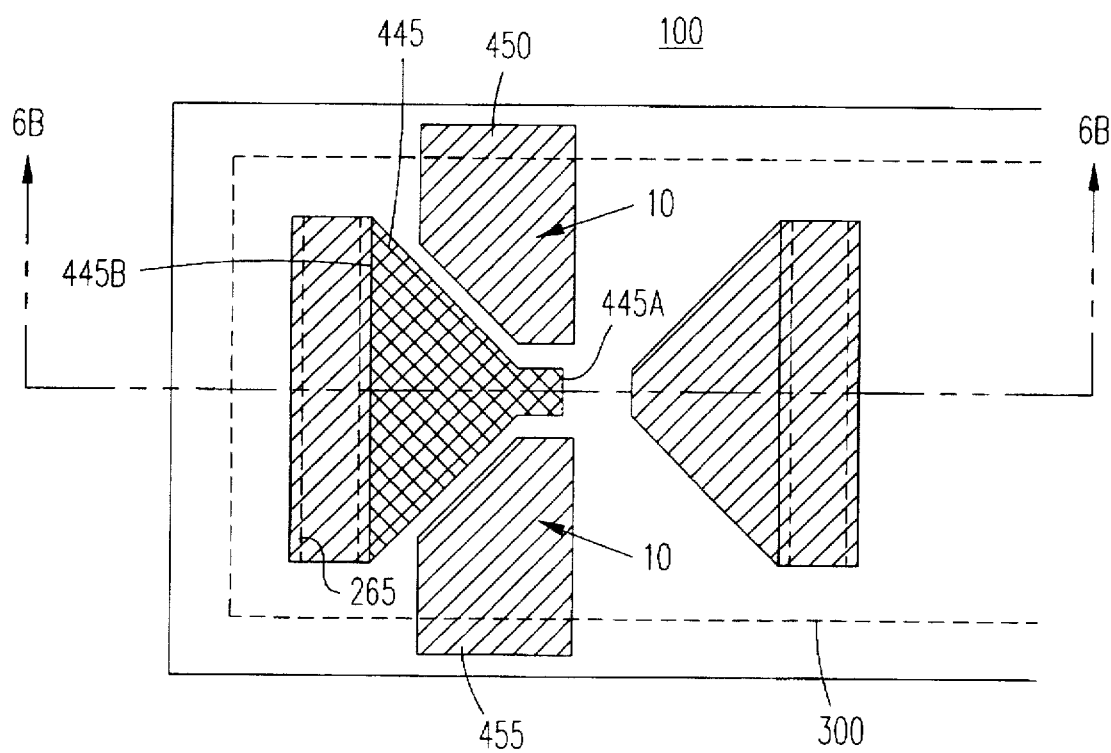
FIG. 6A is a top plan view of the thin film head after a first pole extension is formed on one of the pole support members.
Figure 6B:
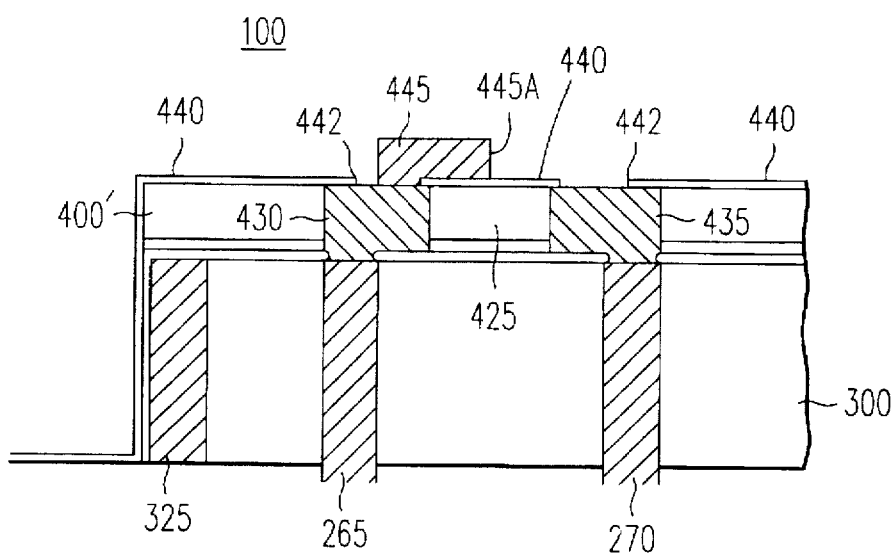
FIG. 6B is a cross-sectional view of the thin film head of FIG. 6A taken along section line 6B—6B.

Another seed layer 440 of material suitable for plating such as Cr-Ni-V is patterned atop the upper surface of partially complete head 100 as shown in FIG. 6B. The lift-off process described earlier is used to pattern seed layer 440 with openings 442 as illustrated. It is noted that in this particular embodiment, seed layer 440 extends partially over the pole wells.

A first upper pole piece extension 445 is patterned on the upper surface of head 100 of FIG. 6B. Pole piece extension 445 extends from pole piece support member 430 toward a gap end 445A. Pole piece extension 445 thus in this particular embodiment includes a gap end 445A which is relatively narrow and a wide end 445B which is relatively wide as seen in FIG. 6A. Magnetic control regions 450 and 455 are plated at the same time that upper pole piece extension 445 is plated. In actual practice, to plate extension 445 on pole piece support member 430 and seed layer 440, the upper surface of head 100 is covered with photoresist (not shown) except for the portion thereof where extension 445 is to be plated. Extension 445 is then plated using magnetic material as the plating material. More particularly, extension 445 is plated atop pole piece support member 430 and seed layer 440. The photoresist layer is then washed away leaving plated extension 445 in the position shown in FIG. 6B.

Figure 7A:
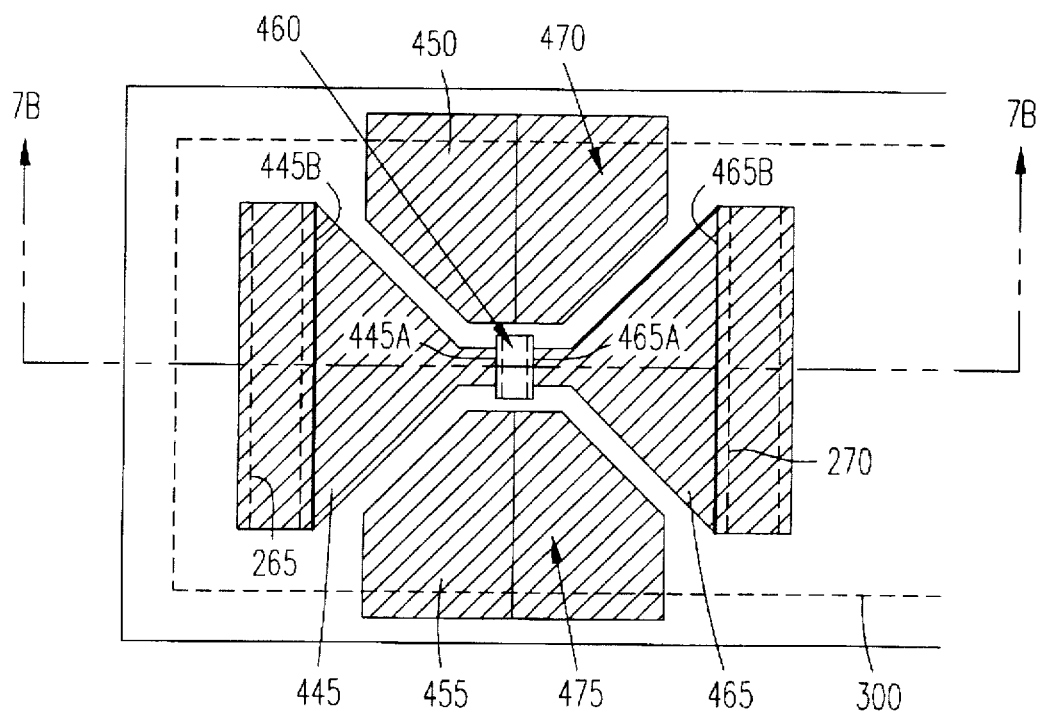
FIG. 7A is a top plan view of the thin film head after a second pole extension an a gap region are formed on the head.
Figure 7B:
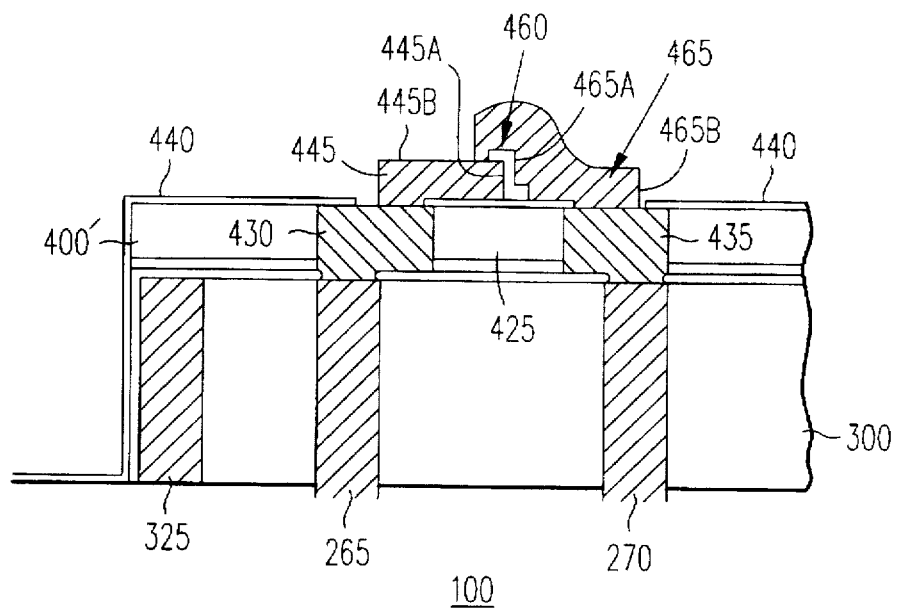
FIG. 7B is a cross-sectional view of the thin film head of FIG. 7A taken along section line 7B—7B.

A substantially rectangular gap region 460 of non-magnetic material is plated adjacent pole end 445A as shown in FIGS. 7A and 7B. One non-magnetic material which may be used to fabricate gap region 360 is NiP. More particularly, the upper surface of partially complete head 100 of FIGS. 7A and 7B is covered with a layer of photoresist (not shown) having an opening at the location where gap region 460 is to be plated. Plating is then conducted atop seed layer 440 through the photoresist opening. The photoresist layer is removed to form gap region 460 as illustrated. Gap region 460 is actually situated between first pole piece extension 445 and a second pole piece extension 465 which is now described.

A second upper pole piece extension 465 is patterned on the upper surface of head 100 of FIGS. 7A and 7B. Pole piece extension 465 extends from pole piece support member 435 toward a gap end 465A. In this particular embodiment, pole piece extension 465 includes a gap end 465A which is relatively narrow and a wide end 465B which is relatively wide as seen in FIG. 7A. Magnetic control regions 470 and 475 are plated at the same time that upper pole piece extension 465 is plated. In actual practice, to plate extension 445 on pole piece support member 435 and seed layer 440, the upper surface of head 100 is covered with photoresist (not shown) except for the portion thereof where extension 465 is to be plated. Extension 465 is then plated atop pole piece support member 435 and seed layer 440 using magnetic material as the plating material. The photoresist layer is then washed away leaving plated extension 445 in the position shown in FIG. 6B, namely atop seed layer 440 and support member 435 and overlapping gap region 460.

At the same time that pole piece extension 445 is plated, additional magnetic control layers 450 and 455 are plated atop head 100 to enhance the plating of extension 445.

Likewise at the same time that pole piece extension 465 is plated, additional magnetic control layers 470 and 475 are plated atop head 100 for the same purpose. While optional, it has been found that plating additional magnetic control layers 450, 455 and 470, 475 serves to better control local plating current density. Such current density influences NiFe composition and enhances the effect of the easy axis magnetic orienting field. Magnetic yoke 145 including bottom magnetic layer 150, side poles 266, 270, upper pole piece extensions 430, 435 and pole piece extensions 445, 465 are all subjected to an easy axis magnetic orienting field of approximately 1000 Gauss to approximately 10,000 Gauss, provided by an external magnet. This action gives a desired magnetic domain structure to pole piece extensions 445, 465 and the other components of magnetic yoke 145.

While in the particular embodiment of head 100 illustrated in FIG. 7A, gap region 460 exhibits a substantially rectangular shape, other shapes for gap region 460 may be used as well as long as the selected shape spans the region between narrow gap end 445A and narrow gap end 465A. For example, gap region 460 may exhibit circular, elliptical or other geometries.

Figure 8A:
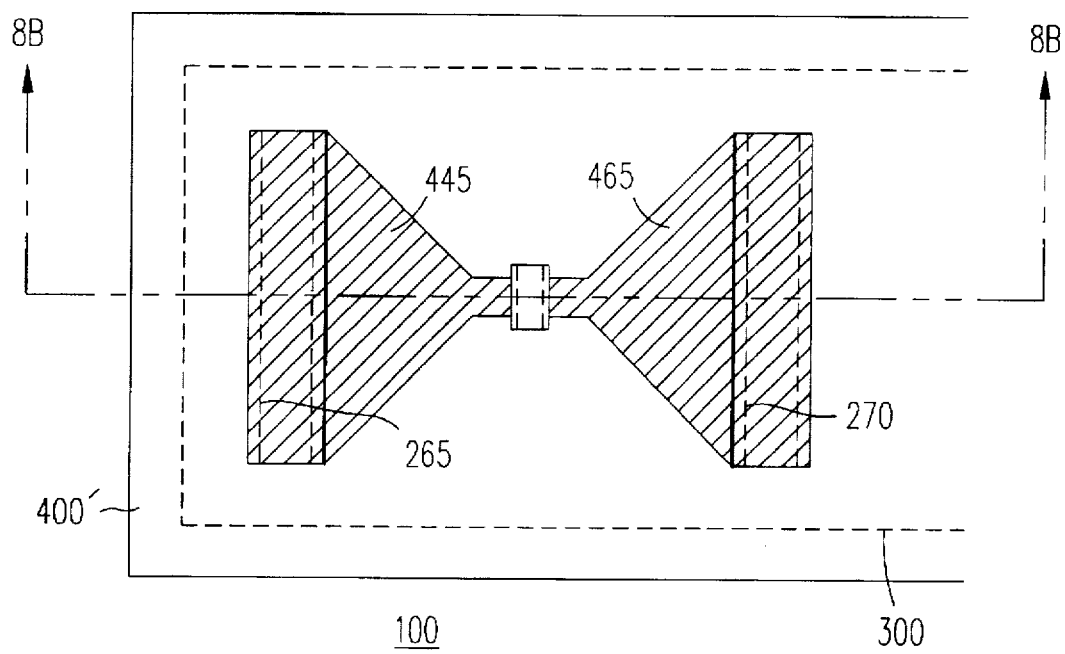
FIG. 8A is a top plan view of the thin film head after the magnetic control regions have been removed.
Figure 8B:
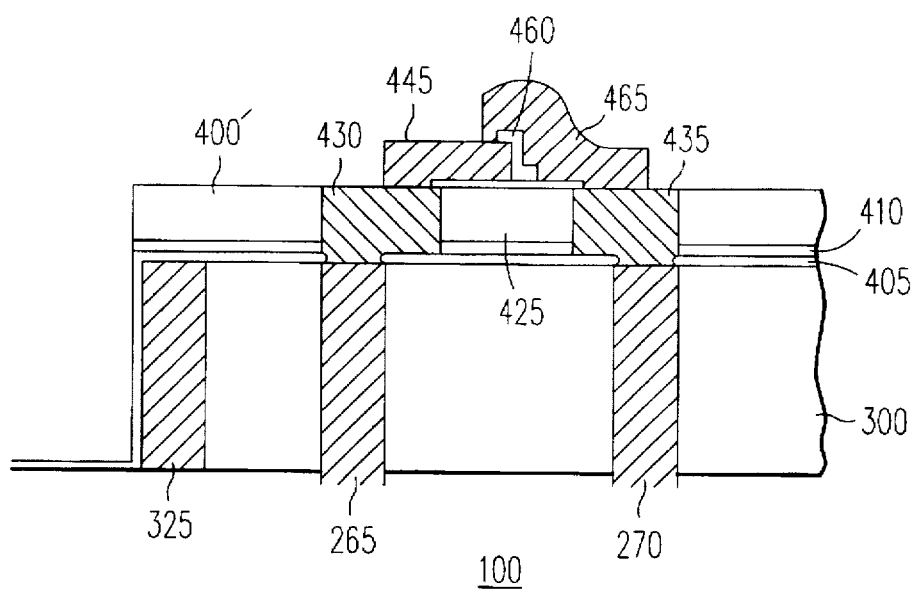
FIG. 8B is a cross-sectional view of the thin film head of FIG. 8A taken along section line 8B—8B.

After first upper pole piece extension 445 and second upper pole piece extension 465 are formed as described above, magnetic control regions 450, 455, 470 and 475 are removed by etching. To accomplish this, the upper surface of head 100 of FIG. 7A is covered with photoresist which is patterned to leaving openings which expose these control regions to etchant. The photoresist is then washed away. In this manner, the partially complete head 100 of FIGS. 8A and 8B is formed.

Figure 9A:
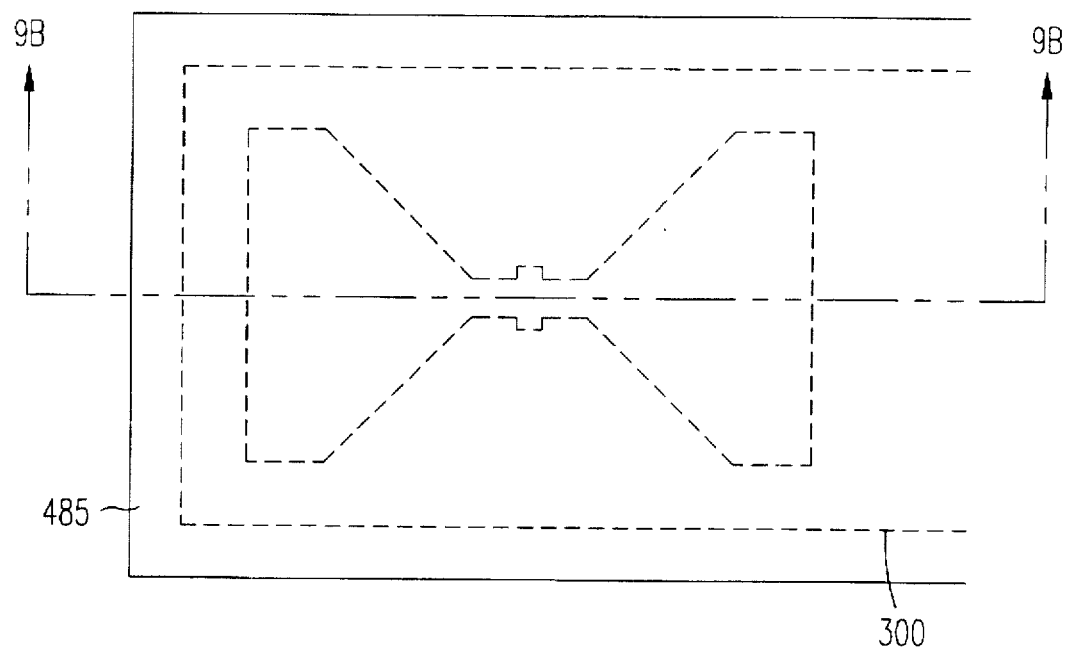
FIG. 9A is a top plan view of the thin film head after the upper surface of the head is covered with a diamond-like carbon (DLC) layer.
Figure 9B:
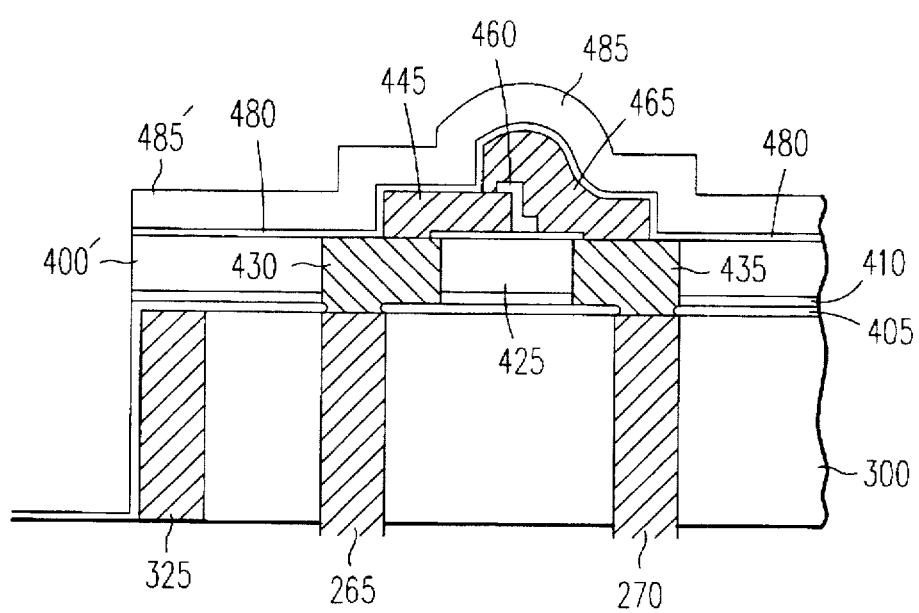
FIG. 9B is a cross-sectional view of the thin film head of FIG. 9A taken along section line 9B—9B.

A silicon adhesion layer 480 is then sputtered on the uppermost surface of head 100 as shown in FIG. 9B. A DLC wear layer 485 is deposited atop silicon adhesion layer 480 as shown in FIG. 9B using the same process described earlier. More specifically, DLC layer 485 is deposited on top of adhesion layer 480 by chemical vapor deposition or other suitable deposition technique. DLC layer 485 is then patterned and etched away from the upper surface of head 100 except for the portion of DLC layer 485 atop DLC frame 400'. In this manner, the DLC layer 485' shown in FIGS. 9A and 9B is formed and shaped.

Figure 10A:
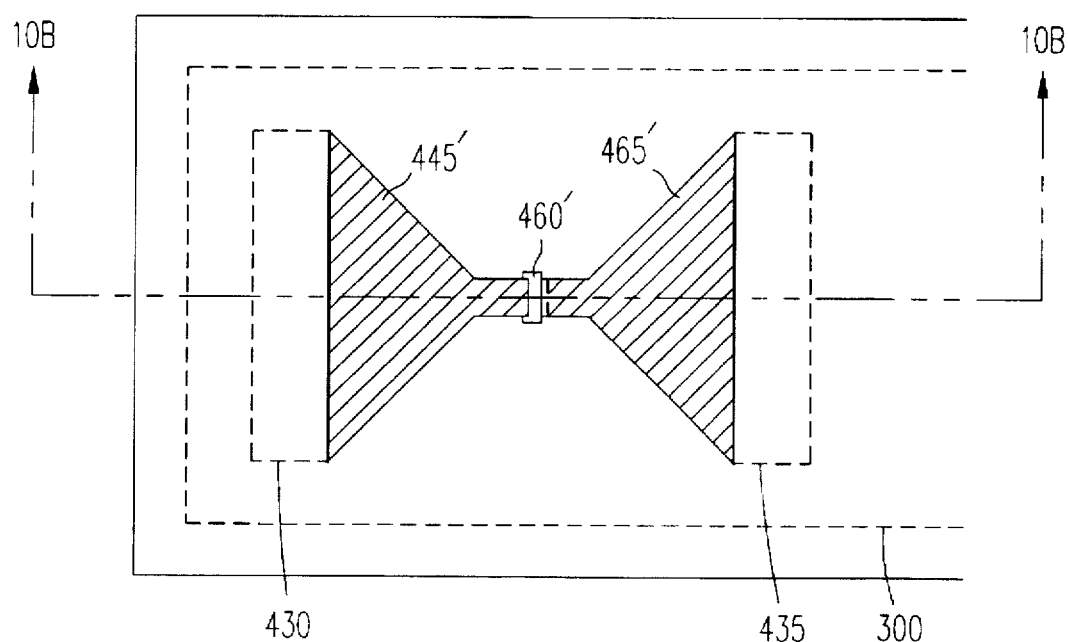
FIG. 10A is a top plan view of the thin film head after the upper surface of the head is machined.
Figure 10B:
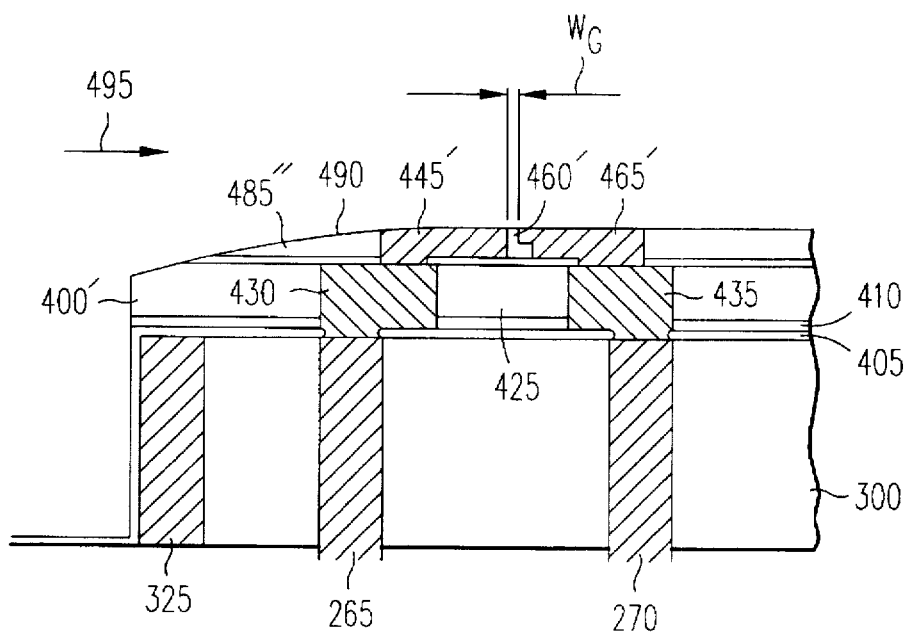
FIG. 10B is a cross-sectional view of the thin film head of FIG. 10A taken along section line 10B—10B.

DLC layer 485', upper pole piece extension 445, upper pole piece extension 465 and gap region 460 are machined down or lapped to form an upper contoured surface 490 as illustrated in FIG. 10B. Contoured DLC layer 485", extension 445', extension 465' and gap region 460' are thus shaped. The direction of motion of the media (not shown) upon which head 100 records and plays is indicated by arrow 495. The leading portion 490A of contoured surface 490 exhibits a substantially convex shape in this particular embodiment. In this particular embodiment leading portion 490A exhibits a radius of approximately 5 to approximately 15 microns. After machining, gap region 460' exhibits a substantially L-shaped cross section.

Figure 12A:
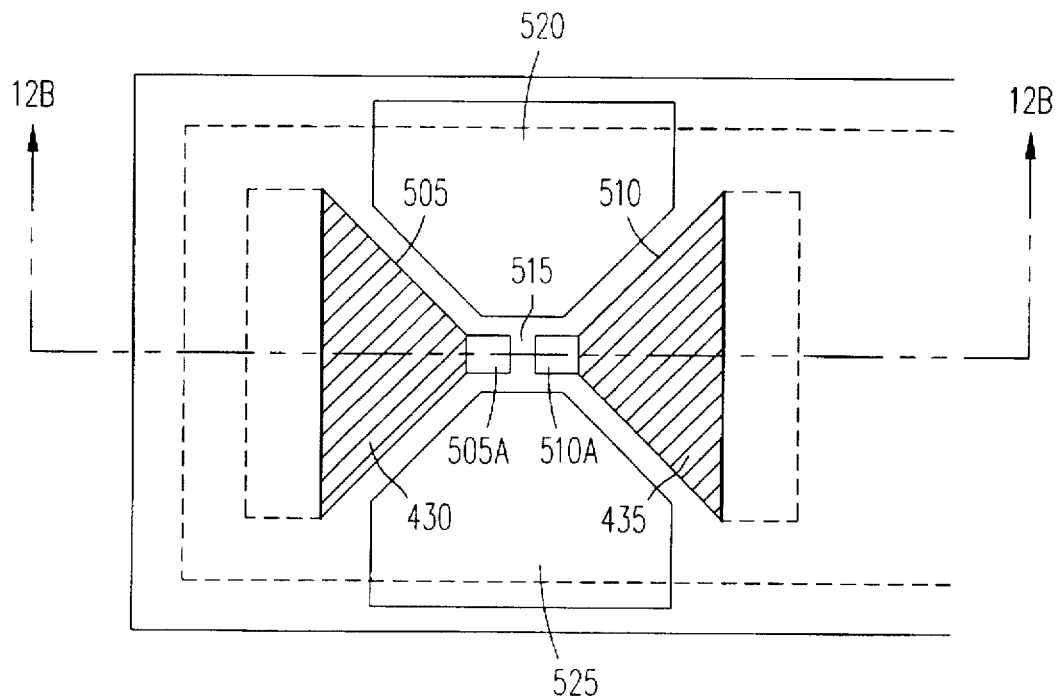
FIG. 12A is a top plan view of the thin film head of FIG. 11 after pole support wells and magnetic control wells are formed in the DLC layer.
Figure 12B:
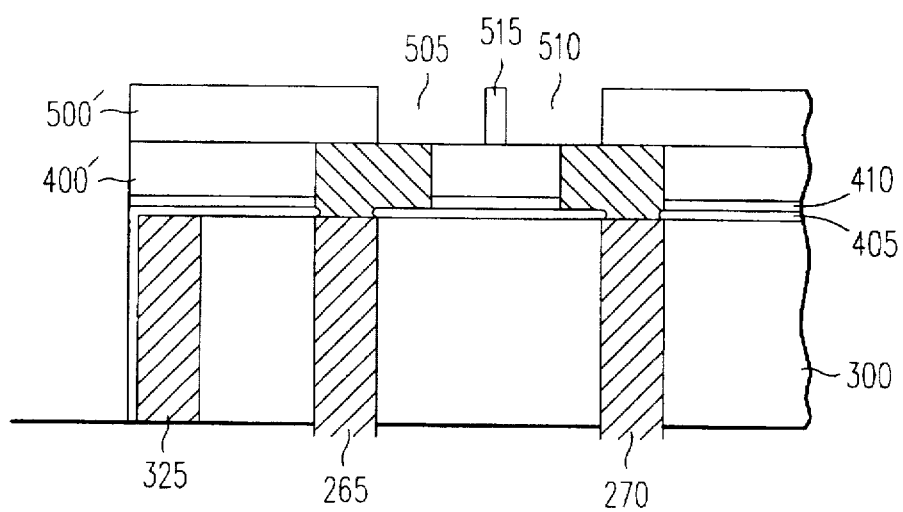
FIG. 12B is a cross-sectional view of the thin film head of FIG. 12A taken along section line 12B—12B.

In an alternative embodiment of thin film head 100, rather than forming gap region 460 from a relatively soft non-magnetic material such as NiP, gap region 460 is formed from relatively hard diamond-like carbon (DLC) material substantially as described in the patent application entitled "THIN FILM MAGNETIC HEAD INCLUDING A DURABLE WEAR LAYER AND GAP STRUCTURE", inventors G. Robert Gray and Arun Malhotra U.S. patent application Ser. No. 08/296,840 filed concurrently herewith, now U.S. Pat. No. 5,563,754 issued on Oct. 8, 1996, and assigned to the assignee of this application, the disclosure thereof being incorporated herein by reference. In this approach, a DLC layer 500 is deposited on the upper surface of the partially complete head 100 of FIG. 5 to form the head structure shown in FIG. 11. DLC layer 500 is then patterned with photoresist (not shown) and etched such that pole extension wells 505 and 510 are formed in DLC layer 500 as shown in FIGS. 12A and 12B. In this particular embodiment, pole extension wells 505 and 510 are each substantially triangular in shape. Pole extension well 505 includes a substantially rectangular gap end 505A at the central vertex of the triangle. Similarly, pole extension well 510 includes a substantially rectangular gap end 510A at the central vertex of the triangle. A DLC gap region 515 is thus formed between pole extension wells 505 and 510 as illustrated.

At the same time that pole wells 505 and 510 are etched, magnetic control wells 520 and 525 are etched. Also at this same time, DLC layer 500 is etched such that any DLC material laterally outside of the boundary of DLC frame 400' is removed. In actual practice, to form wells 505, 510, 520, 525 and remove DLC outside of the DLC frame 400', a layer of photoresist (not shown) is deposited atop the partially complete head 100. This photoresist layer is patterned to include openings for the portions of DLC layer 500 to be etched away. The photoresist is then subjected to reactive ion etching which etches away the above-specified areas of DLC layer 500 thus forming an etched DLC layer 500' as shown in FIGS. 12A and 12B.

Figure 13A:
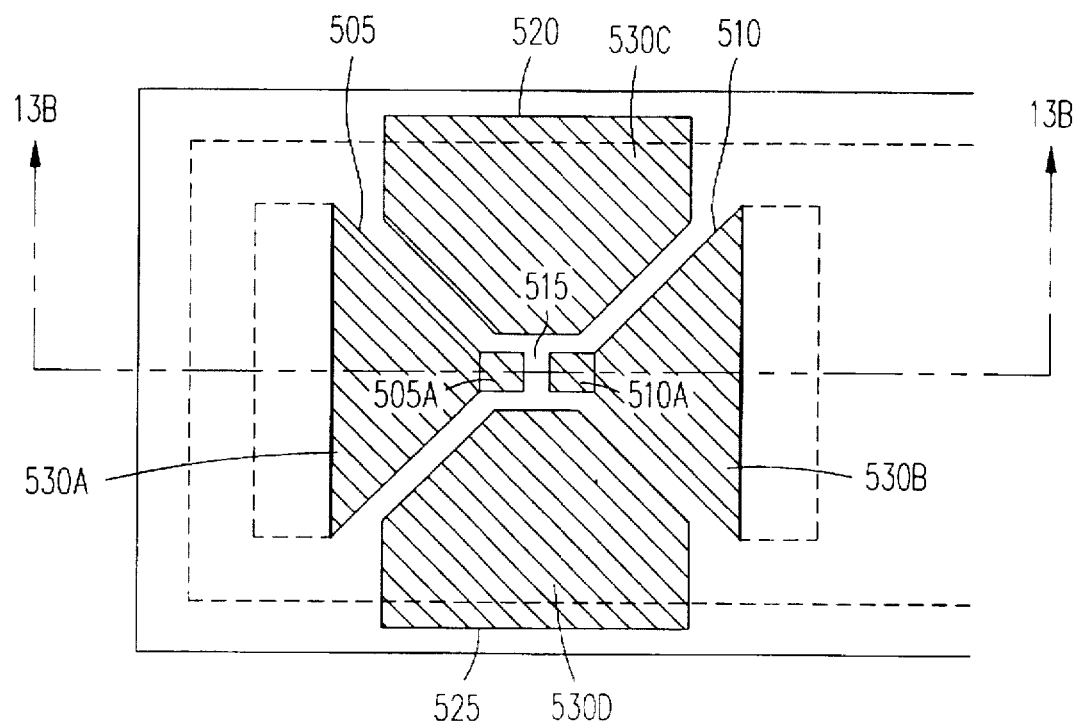
FIG. 13A is a top plan view of the thin film head after a second DLC layer is deposited on the head and after pole extension wells are formed in the second DLC layer.
Figure 13B:
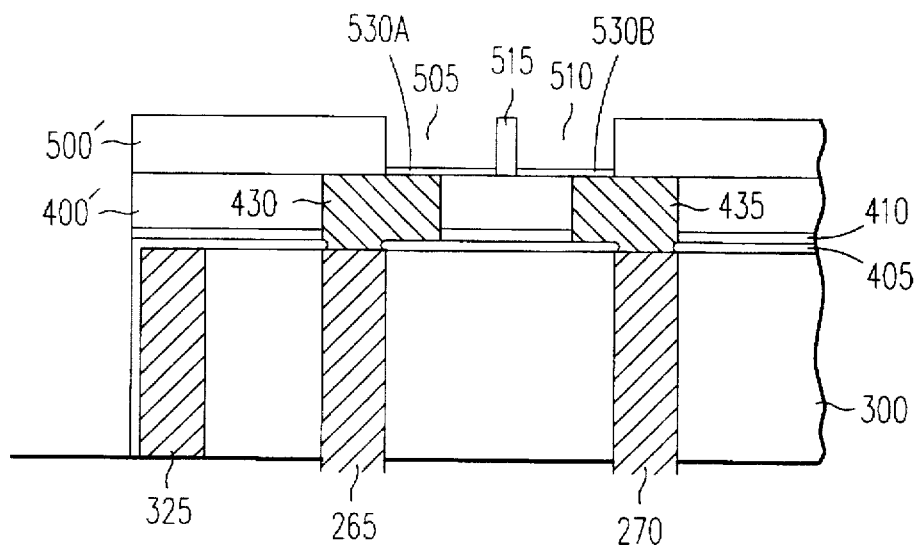
FIG. 13B is a cross-sectional view of the thin film head of FIG. 13A taken along section line 13B—13B.

A seed layer 530 of electrically conductive material suitable for plating is sputtered in pole extension wells 505, 510 and control wells 520, 525 thus forming seed layers 530A, 530B, 530C and 530D, respectively. For example, seed layer 530 may be fabricated from Cr-NiV, namely, a chrome or other adhesion-promoting layer followed by a non-magnetic nickel-vanadium 7% film. To make sure that seed layer 530 is only formed in pole wells 505, 510 and control wells 520, 525, the remainder of head 100 is covered with protective photoresist (not shown) during sputtering of the seed layer. After seed layer 530 is formed, the photoresist is then washed away leaving the structure shown in FIGS. 13A and 13B.

Alternatively, and in actual practice, seed layer 530 may be formed on the surface of DLC layer 400' prior to the formation of DLC layer 500. This is accomplished in substantially the same manner as in the earlier described "lift-off" process. In this approach, photoresist (not shown) is deposited on the surface of DLC layer 400' and extending over pole piece support members 430 and 435. The photoresist is photopatterned to cover the upper surface of DLC layer 400' and pole piece support members 430 and 435 except for the locations intended to become pole wells 505, 510 and control wells 520, 525 shown in FIG. 13A and 13B. A layer 530 of electrically conductive material such as Cr-NiV is then deposited on the photoresist layer. The "lift-off" process is then used to remove all portions of the Cr-NiV layer which covers the photoresist layer, thus leaving seed layers 530A, 530B and 530C, 530D. The head fabrication process then continues with the formation of DLC layer 500 and the etching of pole wells and control wells therein.

Figure 14A:
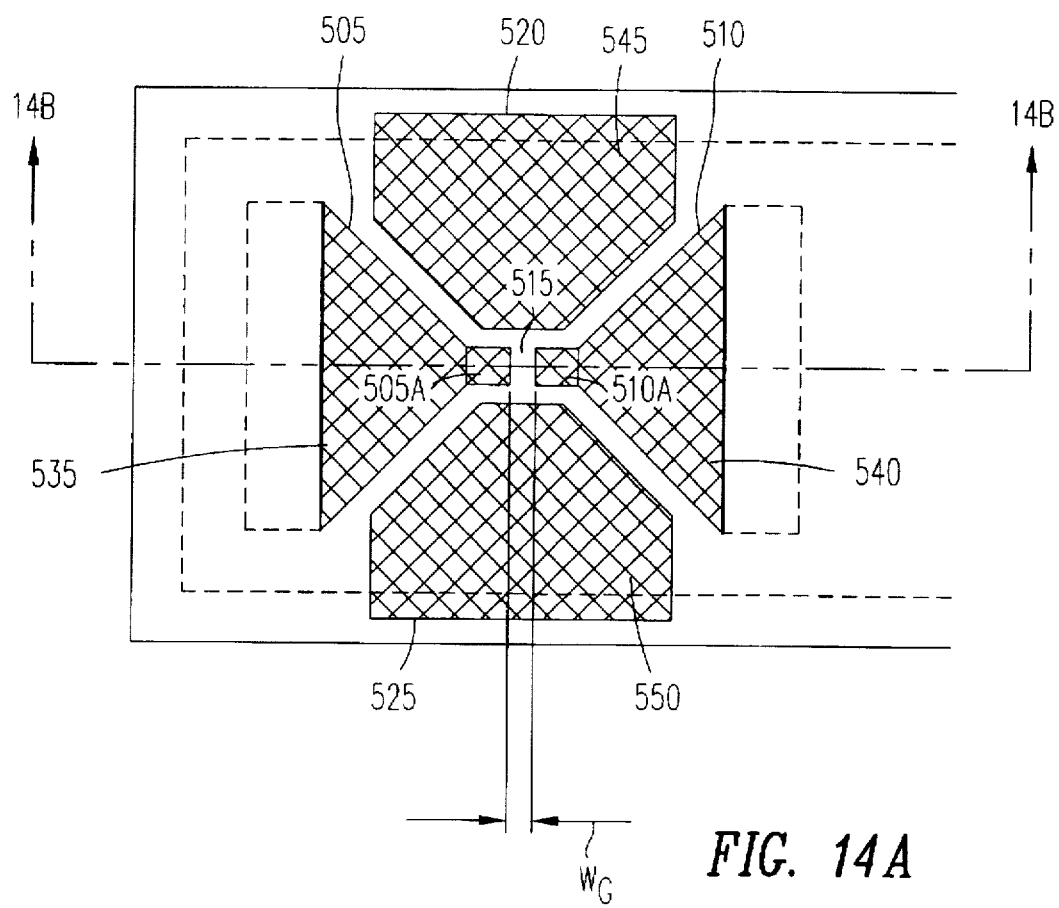
FIG. 14A is a top plan view of the thin film head after the pole extension wells are filled with magnetic pole extensions.
Figure 14B:
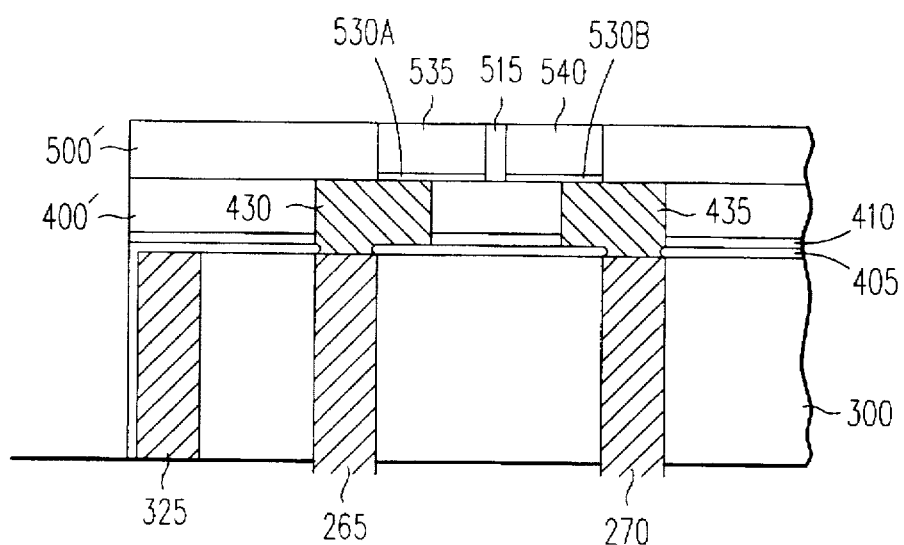
FIG. 14B is a cross-sectional view of the thin film head of FIG. 14A taken along section line 14B—14B.

Pole extension wells 505, 510 are then plated full with a magnetic material such as NiFe to form pole piece extensions 535 and 540 in pole extension wells 505 and 510, respectively. Simultaneously with plating pole piece extensions 535 and 540, magnetic control regions 545 and 550 are plated in magnetic control wells 520 and 525, respectively. A pole piece structure including pole piece extensions 535 and 540 with a DLC gap region 515 therebetween is thus formed as shown in FIGS. 14A and 14B.

The plated material and seed layer in magnetic control wells 520 and 520 is then removed by etching after masking off the remainder of head 100 with protective photoresist which is subsequently washed away. A layer of DLC (not shown) is then deposited on the upper surface of head 100 of FIG. 14B to refill magnetic control wells 520 and 525. The upper surface of head 100 is then machined down as described above with respect to FIG. 10B to provide a contoured surface for the head. While head 100 is provided with a contoured surface in the embodiment described above, an alternative embodiment of head 100 uses a substantially flat upper surface. In this embodiment, the DLC layer which fills magnetic control wells 520 and 525 is machined down such that the upper surface of head 100 exhibits a substantially flat profile such as shown in FIG. 14B.

A simplified embodiment of the invention is formed when the optional additional magnetic control layers 545 and 550 are omitted. In this embodiment, formation of control wells 520 and 525 is omitted when pole wells 505 and 510 are formed by etching DLC frame 500. Pole piece extensions 535 and 540 are plated in pole extension wells 505 and 510 as before. However, since there are no control wells 520 and 525 which require refilling with DLC, the step of depositing a layer of DLC to refill the control wells is omitted.

Figure 15A:
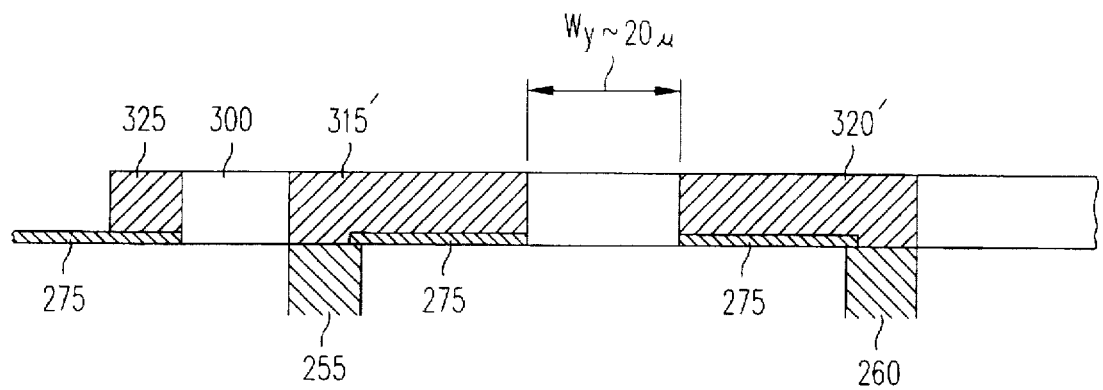
FIGS. 15A–22 illustrate process steps in the fabrication of an alternative embodiment of the invention.
Figure 15B:
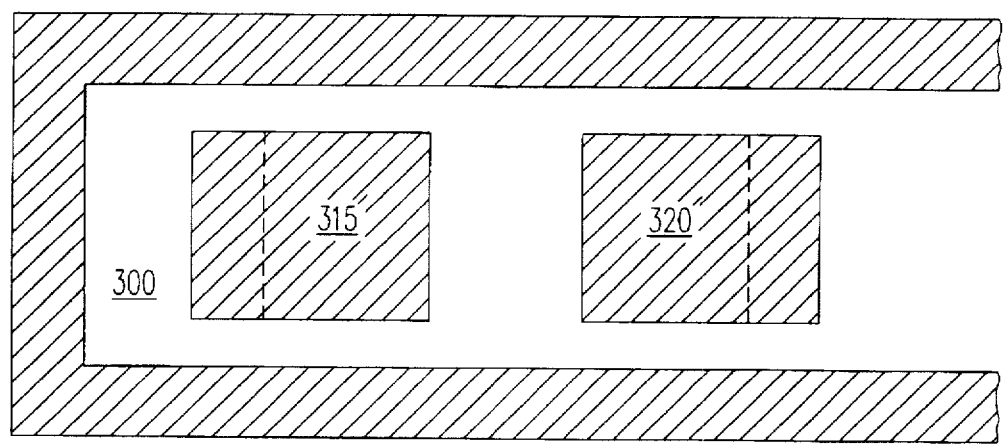

Another embodiment of the invention is illustrated in FIG. 15A and 15B. Rather than etching seed layer 275 complete out between side poles 255 and 270, seed layer 275 is removed between side pole 255 and frame 325. Seed layer 275 is also removed from the gap region between first pole 315' and second pole 320'. Seed layer 275 remains in position above the region between the two side poles 255 and 260 where it is available for plating first pole piece extension 315' and second pole piece extension 320'.

Figure 16A:
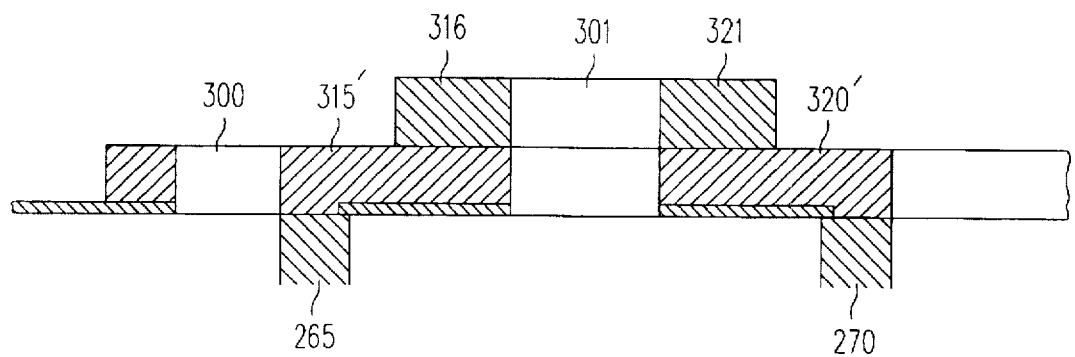
Figure 16B:
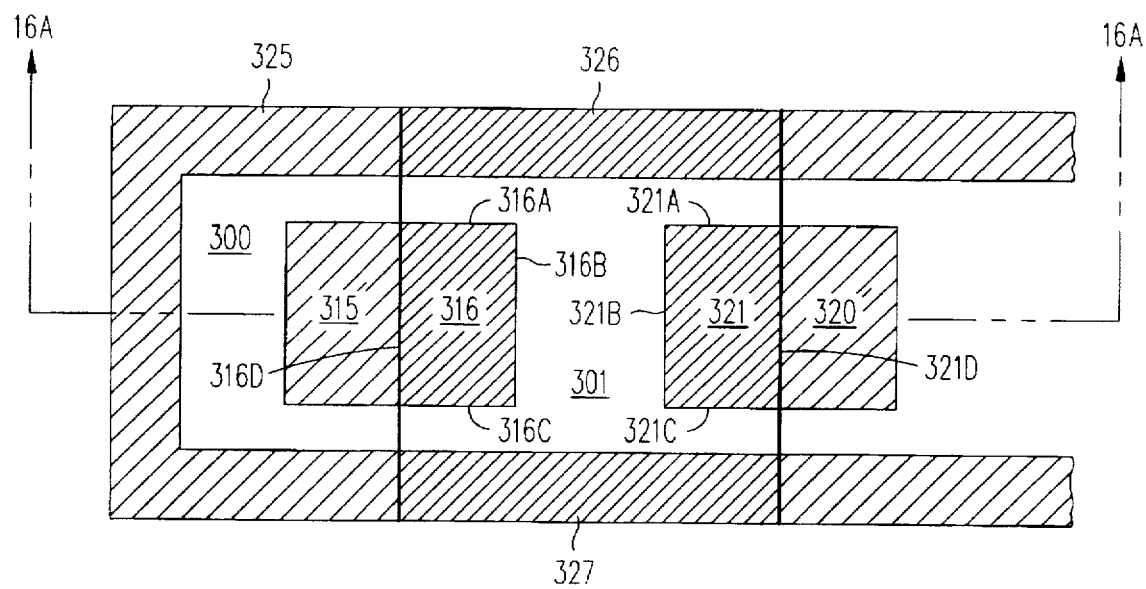

An elevating layer is now formed by plating. More specifically, as shown in FIG. 16A and FIG. 16B, an insulating layer 301 is patterned in photoresist and E-beam cured to define three edges, 316A, 316B and 316C of first pole 316 and three edges 321A, 321B and 321C of second pole 321. Photomasking is used to define the remaining edges 316D and 321D. The opening defined by edges 316A–316D and the opening defined by edges 321A–321D is then plated with a magnetic material such as NiFe as shown in FIG. 16B to form third pole piece extension 316 on top of first pole piece extension 315' and to form fourth pole piece extension 321 on top of second pole piece extension 320'.

The earlier described lift-off process is performed with photoresist covering areas 117A and 117B on the substrate surface (see FIG. 2A) and extensions 316 and 321 on the pedestal to form a Cr-NiV seed layer 361. Seed layer 361 is situated between extension 316 and 321 as shown in FIG. 17.

Figure 17:
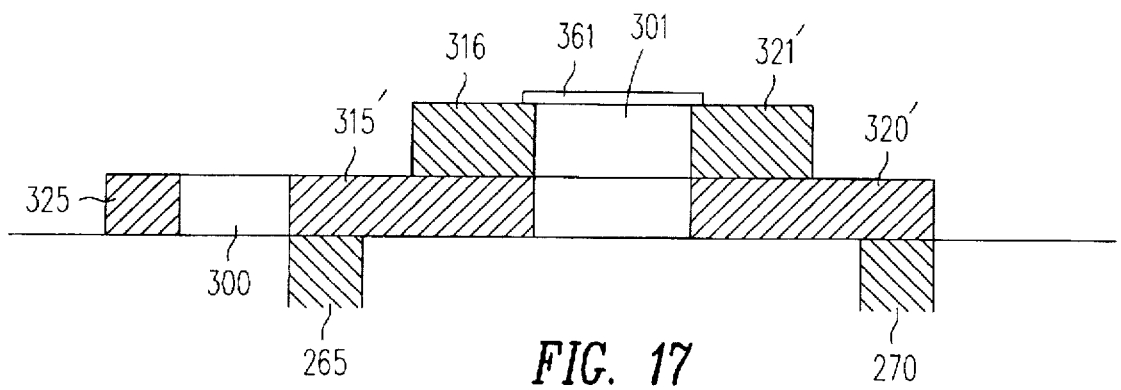
Figure 18:
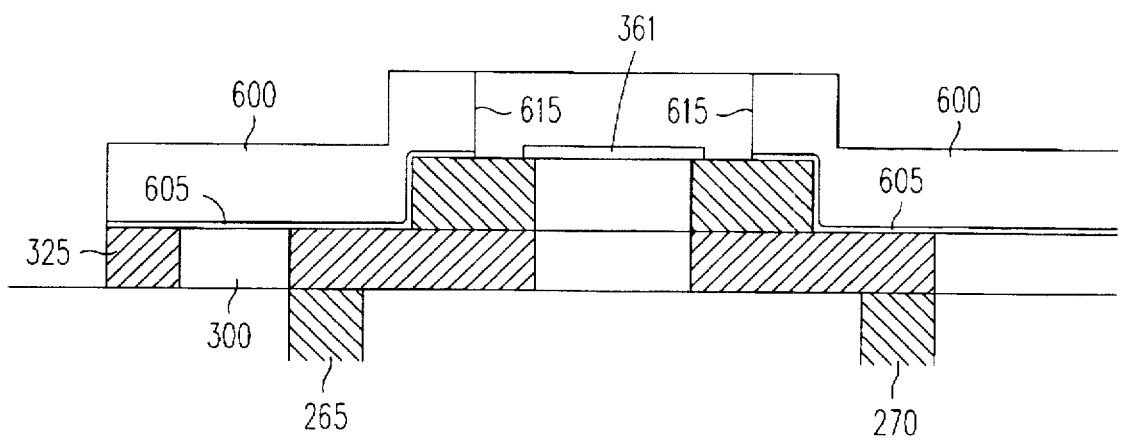

A DLC frame 600 and gap region are now formed atop the structure of FIG. 17 in a manner similar to that of patent application THIN FILM MAGNETIC HEAD INCLUDING A SEPARATELY DEPOSITED DIAMOND-LIKE CARBON GAP STRUCTURE U.S. patent application Ser. No. 08/297,185, abandoned and continued as U.S. patent application Ser. No. 08/795,268 by G. Robert Gray and Arun Malhotra, the disclosure of which is incorporated herein by reference. A silicon adhesion layer 605 is sputtered on the exposed upper surface of head 100 as seen in FIG. 17. A layer of hard durable material 600 such as diamond-like carbon (DLC) is then deposited on adhesion layer 605 as shown in FIG. 18. Adhesion layer 605 enables DLC layer 600 to stick to the upper surface of head 100. This silicon adhesion layer typically exhibits a thickness within the range of approximately 400 Å to approximately 1000 Å. DLC layer 600 is patterned and reactive ion etched to remove portions thereof outside of frame 325 thus forming a DLC frame 600 which surrounds frame 325. DLC frame 400 exhibits a Knoop hardness greater than 700 Knoop and preferably greater than 800 Knoop. The hardness of protective layer 400 should be within the range of greater than approximately 700 Knoop to approximately 2000 Knoop. For simplicity, silicon adhesion layer 605 is not shown in the subsequent drawings.

Figure 19:
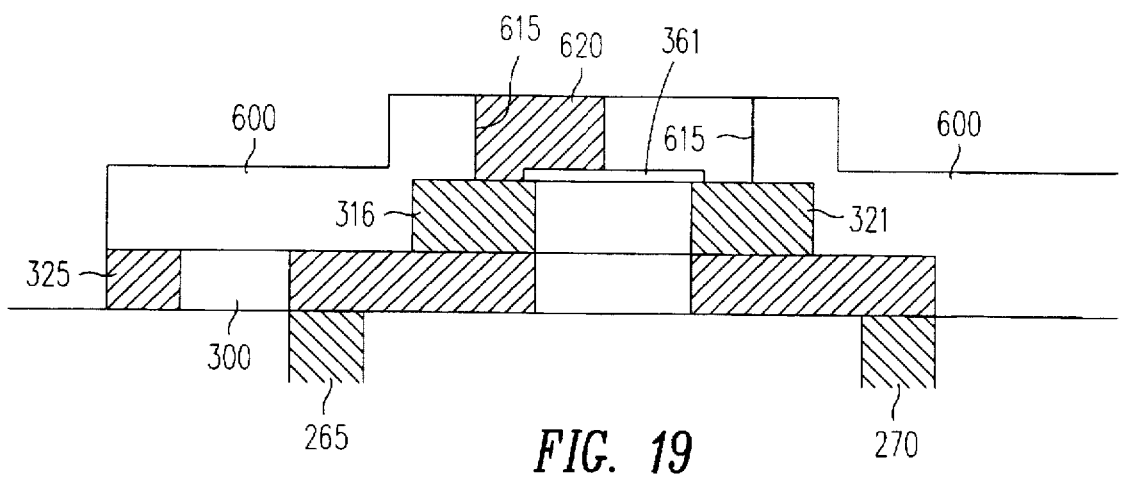

As part of these patterning and reactive ion etching steps which form DLC frame 600, DLC layer 600 is patterned and etched to form a pole well 615. A first magnetic pole 620 is plated in pole well 615 atop extension 316 and seed layer 361 to pole well 615 up to a level even with the top of DLC frame 600 as shown in FIG. 19. First magnetic pole 620 is electrically and magnetically coupled to side pole 265.

Figure 20:
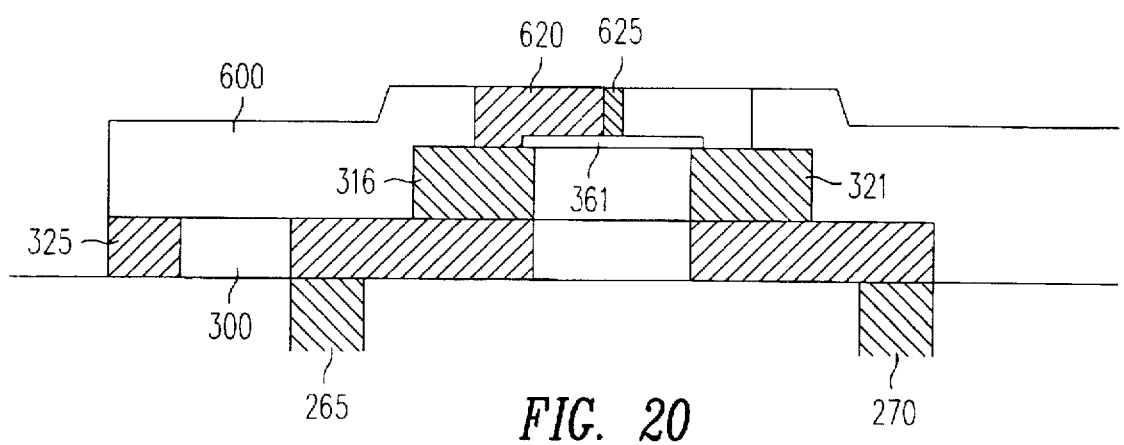

A layer of DLC is then deposited by chemical vapor deposition on the uppermost surfaces of the partially formed head 100, such DLC layer then being patterned and reactive ion etched to leave a DLC gap region 625 remaining as shown in FIG. 20. In more detail, a DLC layer (not shown) is deposited by the deposition process described earlier over all the substrate or wafer on which the partially formed head 100 (and other like heads 100) are situated. This DLC layer is then masked off with photoresist so as to only expose the DLC layer at the location of gap region 625 which is shown in FIG. 20. A DLC gap region 625 is thus formed by removal of this DLC layer except for the portion thereof in gap region 625. Reactive ion etching is used to achieve removal of the exposed portions of the DLC layer.

Figure 21:
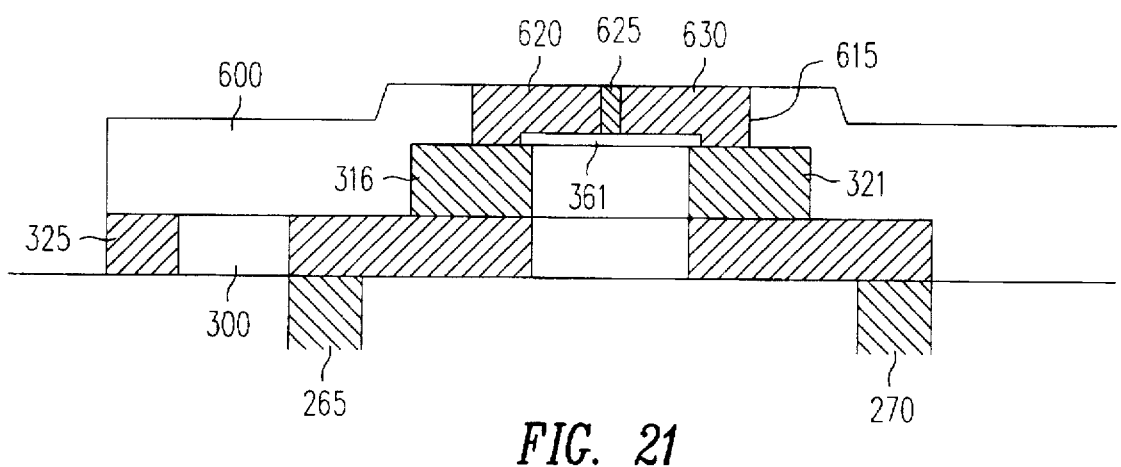
Figure 22:
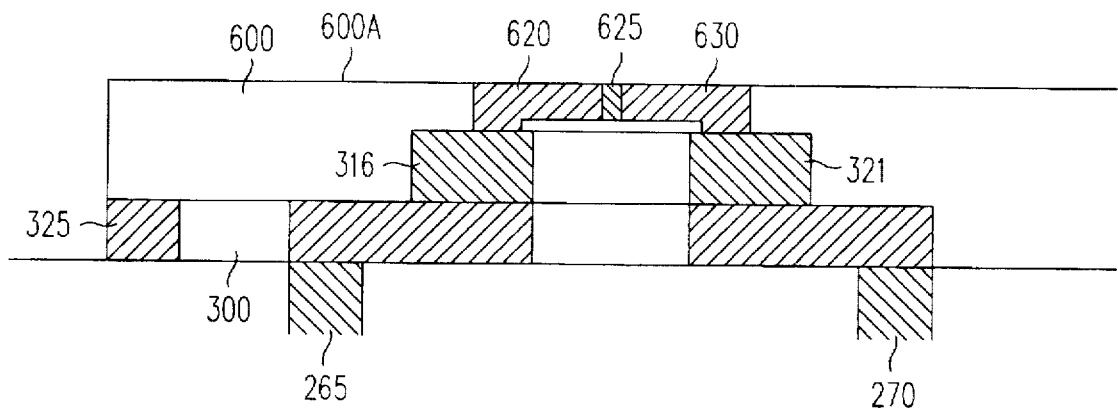

Preparations are now made for the plating of second magnetic pole 630 on seed layer 361 in well 615 as shown in FIG. 21. To implement this plating only in the areas specified above, the remaining areas of the upper surface of partially completed head 100 are covered with photoresist (not shown). NiFe plating is then conducted to form second magnetic pole 630. The photoresist is then removed leaving the pole/gap structure shown in FIG. 21. DLC layer 600 is then machined down or lapped to form a substantially planar top surface 600A as shown in FIG. 22.

While a thin film magnetic head apparatus has been described above, it is clear that a method of fabricating such a magnetic head apparatus is also disclosed. Briefly, a method of fabricating a thin film magnetic head is provided which includes the step of forming a lower pole member of magnetic material on the substrate, the lower pole member including first and second ends. The method includes the step of forming first and second side pole members of magnetic material at the first and second ends, respectively, of the lower pole member. The first and second side pole members are built up from a plurality of layers of magnetic material deposited layer upon layer. The first and second side pole members include tops and bottoms. The method further includes the step of forming a conductor coil around one of the first and second side pole members while the first and second side pole members are being formed, the conductor coil being separated from the first and second side pole members by insulative layers. The method also includes the step of forming an insulative pedestal at the tops of the first and second side pole members, the insulative pedestal extending above the plane of the insulative layers below and surrounding the tops of the first and second side pole members. The method further includes the step of depositing a first diamond-like carbon (DLC) layer on the insulative pedestal. The method also includes the step of excavating first and second pole support wells in the DLC layer to expose the tops of the first and second side pole members, the first and second pole support wells being laterally spaced apart to form a DLC gap section therebetween. The method still further includes the step of forming first and second pole piece support members of magnetic material in the first and second pole support wells. The method also includes the step of forming a first pole piece extension atop the first pole piece support member, the first pole piece extension including a first gap end. The method further includes the step of forming a gap region of non-magnetic material at the first gap end of the first pole piece extension. The method still further includes the step of forming a second pole piece extension atop the second pole piece support member, the second pole piece extension including a second gap end which abuts the gap region of non-magnetic material.

The foregoing has described a thin film magnetic head in which head wear is significantly reduced. The disclosed head exhibits a narrow gap width, $W_G$, within the range of approximately 0.2 microns to approximately 0.8 microns which results in correspondingly high density magnetic recording capabilities. Advantageously, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A thin film magnetic head comprising:

a substrate;

a lower pole member of magnetic material situated on the substrate wherein said lower pole member has first and second ends;

first and second side pole members of magnetic material situated at the first and second ends, respectively, of the lower pole member, the first and second side pole members being built up from a plurality of layers of magnetic material deposited layer upon layer, each of the first and second side pole members including tops and bottoms;

an insulative body situated about the first and second side poles and built up from a plurality of layers of electrically insulative material;

a conductor coil situated within the insulative body and around one of the first and second side pole members;

an insulative pedestal situated at the tops of the first and second side pole members, the insulative pedestal extending above the plane of the insulative body and surrounding the tops of the first and second side pole members;

a diamond-like carbon (DLC) layer situated on the insulative pedestal and including first and second pole support wells which are open to the tops of the first and second side pole members below, the first and second pole support wells being laterally spaced apart to form a DLC gap section therebetween;

first and second pole piece support members of magnetic material situated in the first and second pole support wells, respectively;

first and second pole piece extension members of magnetic material situated atop the first and second pole piece support members, respectively; and a gap region of nonmagnetic material situated between the first and second pole piece extension members.

2. The thin film head of claim 1 further comprising:

a second diamond-like carbon (DLC) layer situated in the same plane as the first and second pole piece extension members, the second DLC layer substantially surrounding the first and second pole piece extension members, the second DLC layer including an upper surface.

3. The thin film head of claim 2 wherein the first and second pole piece extension members, the gap region and the upper surface of the second DLC layer together form the upper surface of the thin film head, a portion of the upper surface of the thin film head exhibiting a substantially convex contour.

4. The thin film magnetic head of claim 1 further comprising an electrically conductive seed layer situated between the pedestal and the first DLC layer, the seed layer including open regions at the tops of the first and second side pole members.

5. The thin film magnetic head of claim 4 further comprising a silicon adhesion layer situated on the seed layer for enhancing the adhesion of the first DLC layer to the insulative pedestal.

6. The thin film magnetic head of claim 1 wherein the gap region is fabricated from one of the group consisting of NiP and diamond-like carbon (DLC).

* * * * *